US012047883B2

United States Patent
Wernersson et al.

(10) Patent No.: US 12,047,883 B2
(45) Date of Patent: Jul. 23, 2024

(54) RESTRICTING SOUNDING REFERENCE SIGNAL (SRS) POWER CONTROL CONFIGURATIONS

(71) Applicant: Telefonaktiebolaget LM Ericsson (publ), Stockholm (SE)

(72) Inventors: Niklas Wernersson, Kungsängen (SE); Robert Mark Harrison, Grapevine, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 608 days.

(21) Appl. No.: 17/279,879

(22) PCT Filed: Sep. 24, 2019

(86) PCT No.: PCT/EP2019/075706
§ 371 (c)(1),
(2) Date: Mar. 25, 2021

(87) PCT Pub. No.: WO2020/064727
PCT Pub. Date: Apr. 2, 2020

(65) Prior Publication Data
US 2022/0039028 A1 Feb. 3, 2022

Related U.S. Application Data

(60) Provisional application No. 62/737,585, filed on Sep. 27, 2018.

(51) Int. Cl.
*H04W 52/00* (2009.01)
*H04L 5/00* (2006.01)
*H04W 52/32* (2009.01)

(52) U.S. Cl.
CPC ......... *H04W 52/325* (2013.01); *H04L 5/0007* (2013.01); *H04L 5/0048* (2013.01)

(58) Field of Classification Search
CPC ..... H04W 52/325; H04L 5/007; H04L 5/0048
See application file for complete search history.

(56) References Cited

U.S. PATENT DOCUMENTS

| 2018/0062810 | A1 | 3/2018 | Vitthaladevuni et al. |
| 2019/0044681 | A1* | 2/2019 | Zhang ................. H04L 5/0094 |
| 2019/0159136 | A1* | 5/2019 | MolavianJazi ..... H04W 52/362 |

FOREIGN PATENT DOCUMENTS

| EP | 3255830 A1 | 12/2017 |
| JP | 2013236288 A | 11/2013 |
| JP | 2017504259 A | 2/2017 |

OTHER PUBLICATIONS

EPO Communication dated Apr. 5, 2022 for Patent Application No. 19778945.6, consisting of 11-pages.
(Continued)

*Primary Examiner* — Erika A Washington
(74) *Attorney, Agent, or Firm* — Weisberg I.P. Law, P.A.

(57) ABSTRACT

Methods and apparatuses are disclosed for restricting SRS power control configurations. In one embodiment, a method implemented in a wireless device, WD, is provided. The method includes obtaining at least a first sounding reference signal, SRS, resource set configuration for a first SRS resource set, the first SRS resource set configuration corresponding to a first SRS transmission power value; obtaining at least a second SRS resource set configuration for a second SRS resource set, the second SRS resource set configuration corresponding to a second SRS transmission power value; and determining a power level to transmit an SRS on at least one SRS resource associated with at least one of the first SRS resource set and the second SRS resource set.

21 Claims, 13 Drawing Sheets

(56) References Cited

OTHER PUBLICATIONS

3GPP TSG RAN WG1 Meeting #94 R1-1809772 (18xxxx); Title: Summary for AI 7.1.5 NR UL power control in non-CA aspects; Agenda Item: 7.1.5; Source: ZTE; Document for: Discussion and Decision; Date and Location: Aug. 20-24, 2018, Gothenburg, Sweden, consisting of 30-pages.

Indian Office Action dated Feb. 11, 2022 for Patent Application No. 202117014458, consisting of 7-pages.

International Search Report and Written Opinion dated Dec. 10, 2019 for International Application No. PCT/EP2019/075706 filed on Sep. 24, 2019, consisting of 13-pages.

3GPP TS 38.213 V15.1.0; 3rd Generation Partnership Project; Technical Specification Group Radio Access Network; NR; Physical layer procedures for control (release 15); Mar. 2018, consisting of 77-pages.

3GPP TSG-RAN WG1 Meeting #94 R1-1809412; Title: SRS power scaling in UL power control; Source: Ericsson; Agenda Item: 7.1.8; Document for: Discussion and Decision; Date and Location: Aug. 20-24, 2018, Goteborg, Sweden, consisting of 15-pages.

3GPP TSG RAN WG1 Meeting 91 R1-1720361; Title: Remaining issues on UL Power Control; Source: Samsung; Agenda Item: 7.6.1; Document for: Discussion and Decision; Date and Location: Nov. 27-Dec. 1, 2017, Reno, USA, consisting of 14-pages.

3GPP TSG RAN WG1 Meeting #91 R1-1719968; Title: On uplink power control for NR; Source: OPPO; Agenda Item: 7.6.1; Document for: Discussion and Decision; Date and Location: Nov. 27-Dec. 1, 2017, Reno, USA, consisting of 7-pages.

3GPP TSG RAN WG1 Meeting #92bis R1-1803641; Title: Remaining details of UL power control design; Source: Huawei, HiSilicon; Agenda Item: 7.1.6.1; Document for: Discussion and decision; Date and Location: Apr. 16-20, 2018, Sanya, China, consisting of 7-pages.

3GPP TSG RAN WG1 Meeting #92 R1-1801462; Title: Remaining details of UL power control design; Source: Huawei, HiSilicon; Agenda Item: 7.1.6.1; Document for: Discussion and decision; Date and Location: Feb. 26-Mar. 2, 2018, Athens, Greece, consisting of 14-pages.

* cited by examiner

RESTRICTING SOUNDING REFERENCE SIGNAL (SRS) POWER CONTROL CONFIGURATIONS

CROSS-REFERENCE TO RELATED APPLICATIONS

This application is a Submission Under 35 U.S.C. § 371 for U.S. National Stage Patent Application of International Application No.: PCT/EP2019/075706, filed Sep. 24, 2019 entitled "RESTRICTING SOUNDING REFERENCE SIGNAL (SRS) POWER CONTROL CONFIGURATIONS," which claims priority to U.S. Provisional Application No. 62/737,585, filed Sep. 27, 2018, entitled "RESTRICTING SRS POWER CONTROL CONFIGURATIONS," the entireties of both of which are incorporated herein by reference.

TECHNICAL FIELD

Wireless communication and in particular, to restrictions on sounding reference signal (SRS) power control configurations.

BACKGROUND

The next generation mobile wireless communication system such as the 3$^{rd}$ Generation Partnership Project (3GPP) 5G or new radio (NR) standards, may support a diverse set of use cases and a diverse set of deployment scenarios. The latter may include deployments at both low frequencies (e.g., 100s of MHz), similar to Long Term Evolution (LTE) today, and very high frequencies (e.g., mm waves in the tens of GHz).

Codebook-Based Precoding

Multi-antenna techniques can significantly increase the data rates and reliability of a wireless communication system. The performance can in particular improved if both the transmitter and the receiver are equipped with multiple antennas, which can result in a multiple-input multiple-output (MIMO) communication channel. Such systems and/or related techniques are commonly referred to as MIMO.

The NR standard is currently being discussed. A component in NR may be the support of MIMO antenna deployments and MIMO-related techniques. NR may support uplink MIMO with at least 4 layer spatial multiplexing using at least 4 antenna ports with channel-dependent precoding. The spatial multiplexing mode is aimed for high data rates in favorable channel conditions. An illustration of the spatial multiplexing operation is provided in FIG. 1 where cyclic prefix-orthogonal frequency division multiplexing (CP-OFDM) is used on the uplink.

As seen in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing can be achieved since multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) can thus be modeled by, $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel-dependent precoding. This is also commonly referred to as closed-loop precoding and essentially strives for focusing the transmit energy into a subspace which is strong in the sense of conveying much of the transmitted energy to the wireless device (WD) (e.g., user equipment (UE)). In addition, the precoder matrix may also be selected to strive for orthogonalizing the channel, meaning that after proper linear equalization at the WD, the inter-layer interference is reduced.

One example method for a WD to select a precoder matrix W can be to select the $W_k$ that maximizes the Frobenius norm of the hypothesized equivalent channel:

$$\max_k \left\| \hat{H}_n W_k \right\|_F^2,$$

where
$\hat{H}_n$ is a channel estimate, possibly derived from SRS;
$W_k$ is a hypothesized precoder matrix with index k; and
$\hat{H}_n W_k$ is the hypothesized equivalent channel.

In closed-loop precoding for the NR uplink, the transmission reception point (TRP) transmits, based on channel measurements in the reverse link (uplink), TPMI to the WD that the WD should use on its uplink antennas. The network node (e.g., gNodeB) configures the WD to transmit SRS according to the number of WD antennas the network node would like the WD to use for uplink (UL) transmission to enable the channel measurements. A single precoder that is intended to cover a large bandwidth (wideband precoding) may be signaled.

Information other than TPMI is generally used to determine the UL MIMO transmission state, such as SRS resource indicators (SRIs) as well as transmission rank indicator (TRIs). These parameters, as well as the modulation and coding state/scheme (MCS), and the uplink resources where the Physical Uplink Shared Channel (PUSCH) is to be transmitted, may also be determined by channel measurements derived from SRS transmissions from the WD. The transmission rank, and thus the number of spatially multiplexed layers, may be reflected in the number of columns of the precoder W. For efficient performance, it may be important that a transmission rank that matches the channel properties is selected.

Non-Codebook Based Precoding

NR also supports non-codebook-based transmission/precoding for the PUSCH in addition to codebook-based precoding. For this scheme, a set of SRS resources may be transmitted where each SRS resource corresponds to one SRS port precoded by a precoder selected by the WD. The network node (e.g., gNB) can then measure the transmitted SRS resources and feedback to the WD one or multiple SRS resource indications (SRIs) to instruct the WD to perform the PUSCH transmission using the precoders corresponding to the referred SRS resources. The rank in this case may be determined from the number of SRIs fed back to the WD.

By configuring the WD with the higher layer parameter SRS-AssocCSIRS and with the higher layer parameter ulTxConfig set to 'NonCodebook', the WD may be configured with a non-zero power channel state information-reference signal (NZP CSI-RS) to utilize reciprocity to create the precoders used for SRS and the PUSCH transmission. Hence, by measuring on the specified CSI-RS the WD can be able to perform network node-transparent precoding based on the reciprocity.

Another mode of operation is to instead let the WD choose the precoders such that each SRS resource corresponds to one WD antenna. Hence, in this case the SRS resource would be transmitted from one WD antenna at the time and the SRIs would correspond to different antennas. Thus, by choosing the WD precoders like this the network node may be able to perform antenna selection at the WD by referring to the different SRIs which in turn will correspond to different antennas.

To summarize, non-codebook-based precoding includes both antenna selection, and network node-transparent reciprocity based precoding.

SRS Transmission in NR

Sounding reference signals (SRSs) are used for a variety of purposes in LTE, and are expected to be used for even more purposes in NR. One use for SRS is for uplink channel state estimation, allowing channel quality estimation to enable uplink link adaptation (including determination of which MCS state the WD should transmit with) and/or frequency-selective scheduling. In the context of uplink MIMO, SRSs can also be used to determine precoders and a number of layers that will provide good uplink throughput and/or signal-to-interference-and-noise ratio (SINR) when the WD uses the SRSs for transmission on its uplink antenna array. Additional uses include, for example, power control, uplink timing advance adjustment, beam management, and reciprocity-based downlink (DL) precoding.

Unlike LTE in 3GPP Rel-14, at least some NR WDs may be capable of transmitting multiple SRS resources. This is conceptually similar to multiple CSI-RS resources on the downlink. An SRS resource may include one or more antenna ports, and the WD may apply a beamformer and/or a precoder to the antenna ports within the SRS resource such that they are transmitted with the same effective antenna pattern. One motivation for defining multiple SRS resources in the WD is to support analog beamforming in the WD where a WD can transmit with a variety of beam patterns, but only one at a time. Such analog beamforming may have relatively high directivity, especially at the higher frequencies that can be supported by NR.

In NR, the SRS sequence may be a WD-specifically configured Zadoff-Chu-based sequence and an SRS resource may comprise of 1 or 2 or 4 antenna ports. Another feature that may be supported by NR is repetition of symbols within the resource with factor 1 or 2 or 4. This means that the transmission may be extended to multiple OFDM symbols which is intended for improving the UL coverage of the SRS. An SRS resource typically spans 1 or 2 or 4 adjacent OFDM symbols and all ports may be mapped to each symbol of the resource. SRS resources may be mapped within the last 6 OFDM symbols of an uplink slot. SRS resources may be mapped on either every second or every fourth subcarrier, that is with so-called comb levels either 2 or 4. SRS resources may be configured in SRS resource sets which include one or multiple SRS resources. Some use cases and possible configurations of SRS are presented in the following sections in terms of a set of physical resources (such as subcarriers and OFDM symbols) as presented in FIG. 2, for example.

Higher Layer Parameter SRS-SetUse Set to 'Codebook'

Here the intended use case is codebook-based UL MIMO where one or two SRS resources can be configured within an SRS resource set and each SRS resource contains up to 4 antenna ports. Three potential configurations are illustrated in FIG. 3, where it is assumed that an SRS resource set containing two SRS resources have been configured. Each SRS resource is represented with a different shading in FIG. 3. In these examples, the comb level is two, and each resource is configured with a different comb offset. For the examples, the following should be noted:

In example 1, the SRS resources are transmitted in different OFDM symbols.

In example 2, the SRS resources are transmitted in the same OFDM symbol.

In example 3, a repetition factor of 2 is configured and the SRS resources are starting in different OFDM symbols and are transmitted simultaneously in one OFDM symbol.

Higher Layer Parameter SRS-SetUse Set to 'nonCodebook'

Here the intended use case is non-codebook-based UL MIMO where up to four SRS resources can be configured within an SRS resource set and each SRS resource includes 1 antenna port. Three potential configurations are illustrated in FIG. 4, where it is assumed that an SRS resource set including four SRS resources have been configured. Each SRS resource is represented with a different shading/color in FIG. 4. In these examples, the comb level is four, and each resource is configured with a different comb offset. For the examples, the following should be noted:

In example 1, the SRS resources are transmitted in different OFDM symbols.

In example 2, the SRS resources are transmitted in the same OFDM symbol.

In example 3, a repetition factor of 2 is configured and the SRS resources are starting in different OFDM symbols and pairs of resources are transmitted simultaneously in some OFDM symbols.

Higher Layer Parameter SRS-SetUse Set to 'BeamManagement'

Here the intended use case is beam management where several SRS resources can be configured within potentially several SRS resource sets and each SRS resource includes 1 antenna port. In this example, at each OFDM symbol, only one SRS resource in each of the SRS resource sets can be transmitted. Three potential configurations are illustrated in FIG. 5, where the SRS resource sets are illustrated. Each SRS resource is represented with a different shading/color in FIG. 5. In these examples, the comb level is four, and each resource is configured with a different comb offset. For the examples, the following should be noted:

In example 1a, the 4 SRS resources from the same SRS resource set are transmitted in different OFDM symbols of the same slot.

In example 2, the SRS resources from different SRS resource sets are transmitted in the same OFDM symbols.

In example 1b, the 4 resources from the same SRS resource set are spread out over multiple slots.

Higher Layer Parameter SRS-SetUse Set to 'AntennaSwitching'

Here the intended use case is to obtain knowledge of the entire downlink MIMO channel matrix from uplink measurements, under the assumption of uplink-downlink channel reciprocity. As WDs have typically more receiver (RX) chains than transmitter (TX) chains, the procedure of antenna switching may be used to sound all antennas. Either two or four SRS resources may be configured within an SRS resource set, for the case where the WD has either double or quadruple, respectively, more RX chains than TX chains. Three potential configurations are illustrated in FIG. 6. Each SRS resource is represented with a different shading/color in FIG. 6. In these examples, the comb level is two and all resources are configured with the same comb offset. For the examples, the following should be noted:

In example 1a, two SRS resources from the same SRS resource set are transmitted in different OFDM symbols of the same slot. The resources are either 1-port or 2-port for the case of either 1T2R or 2T4R, respectively. Different antenna ports are mapped to different resources. A guard period of at least one symbol may be required due to the transient effects of the power when antennas are switched. Both cases with and without repetition factor are illustrated, in the left and right of the upper part of the figure, respectively.

In example 1b, two SRS resources of the same SRS resource set, used for sounding different antennas, are configured in different slots. No further guard period is required in this example.

In example 2b, four SRS resources from the same SRS resource set are transmitted in different slots. These resources are 1-port for the case of 1T4R and a different antenna port is mapped to a different resource.

UL Power Control

Setting output power levels of transmitters, base stations in downlink and mobile stations in uplink, in mobile systems is commonly referred to as power control (PC). Objectives of PC include improved capacity, coverage, improved system robustness, and reduced power consumption.

In LTE, PC mechanisms can be categorized into groups including (i) open-loop, (ii) closed-loop, and (iii) combined open and closed-loop. These groups differ as to what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets the transmitter's transmit power accordingly. In a combined open- and closed-loop scheme, both inputs are used to set the transmit power.

In systems with multiple channels between the terminals (e.g., WD) and the network nodes (e.g., base stations, gNB), e.g. traffic and control channels, different power control principles may be applied to the different channels. Using different principles yields more freedom in adapting the power control principle to the needs of individual channels. The drawback is increased complexity of maintaining several PC principles.

SRS Power Control in NR

In 3GPP Technical Specification (TS) 38.213 (V15.0.1) the SRS power control for NR is specified in section 7 where it is specified how to derive $P_{SRS,b,f,c}(i,q_s,l)$ which can be described as the "output" from the UL power control framework; this is the intended output power that should be used by the WD to conduct SRS transmission. When performing SRS transmission, it is specified that, for SRS, the linear value $\hat{P}_{SRS,f,c}(i,q_s,l)$ of the transmit power $P_{SRS,b,f,c}(i,q_s,l)$ on UL bandwidth part (BWP) b of carrier f of serving cell c is split equally across the configured antenna ports for SRS.

For the WD behavior, if a WD transmits SRS on the UL BWP b of carrier f of serving cell c using SRS power control adjustment state with index l, the WD can determine the SRS transmission power $P_{SRS,f,c}(i,q_s,l)$ in the SRS transmission period i as $$P_{SRS,b,f,c}(i, q_s, l) = \min \left\{ \begin{array}{l} P_{CMAX,f,c}(i), \\ P_{O\_SRS,b,f,c}(q_s) + 10 \log_{10}(2^\mu \cdot M_{SRS,b,f,c}(i)) + \\ \alpha_{SRS,b,f,c}(q_s) \cdot PL_{b,f,c}(q_s) + h_{b,f,c}(i, l) \end{array} \right\} [dBm].$$

The power control framework will hence specify a power to use for an SRS resource set and this power is then applied to the SRS resources through a power scaling rule that takes $P_{SRS,b,f,c}(i,q_s,l)$, relating to an SRS resource set, and derives a value that corresponds to a power per SRS resource. This value is used in the actual transmission.

However, since the SRS framework is designed such that an SRS resource can be shared between different SRS resource sets this has implications on the SRS power control that may impact the PC mechanisms. Consider the examples in FIG. 7. In the first (left) example in FIG. 7, there are two SRS resource sets (Set 1 and Set 2) configured and they both share the same single SRS resource (Resource 4). However, the SRS power control is connected to the SRS resource set $q_s$ and it is hence possible that $\hat{P}_{SRS,f,c}(i,qs=1,l) \neq \hat{P}_{SRS,f,c}(i,qs=2,l)$, since different SRS power control parameters can be configured for the different SRS resource sets, implying that the sets should be transmitted with different powers. This may however not be possible since the sets are built up by the same resource, which may be a problem. For the second (right) example of FIG. 7, there is a similar problem. In order to transmit the SRS resource sets with power $\hat{P}_{SRS,f,c}(i,qs=1,l)$ and $\hat{P}_{SRS,f,c}(i,qs=2,l)$, respectively the way SRS resources 3 and 4 can be transmitted will be impacted in a potentially complex way even if the sets are configured such that $\hat{P}_{SRS,f,c}(i,qs=1,l)=\hat{P}_{SRS,f,c}(i,qs=2,l)$.

SUMMARY

Some embodiments advantageously provide methods and apparatuses for restricting or controlling SRS power control configurations to remove ambiguities in the power control framework for SRS resource(s) shared among multiple SRS resource sets.

According to one aspect of this disclosure, a network node is provided. The network node is configured to communicate at least a first sounding reference signal (SRS) resource set configuration for a first SRS resource set associated with the WD, the first SRS resource set configuration corresponding to a first SRS transmission power value; communicate at least a second SRS resource set configuration for a second SRS resource set associated with the WD, the second SRS resource set configuration corresponding to a second SRS transmission power value, each of the at least first and second SRS resource sets associated with at least one shared SRS resource; and receive the at least one shared SRS resource from the WD at a single power level according to at least one predetermined rule.

According to another aspect of this disclosure, a wireless device is provided. The wireless device is configured to obtain at least a first sounding reference signal (SRS) resource set configuration for a first SRS resource set, the first SRS resource set configuration corresponding to a first SRS transmission power value; obtain at least a second SRS resource set configuration for a second SRS resource set, the second SRS resource set configuration corresponding to a second SRS transmission power value, each of the at least first and second SRS resource sets associated with at least one shared SRS resource; and determine a single power level to transmit the at least one shared SRS resource according to at least one predetermined rule.

In one aspect of the present disclosure, a method implemented in a wireless device, WD, is provided. The method includes obtaining at least a first sounding reference signal, SRS, resource set configuration for a first SRS resource set, the first SRS resource set configuration corresponding to a first SRS transmission power value. The method includes obtaining at least a second SRS resource set configuration for a second SRS resource set, the second SRS resource set configuration corresponding to a second SRS transmission power value. The method includes determining a power level to transmit an SRS on at least one SRS resource associated with at least one of the first SRS resource set and the second SRS resource set.

In some embodiments of this aspect, the method includes transmitting the SRS on the at least one SRS resource associated with the at least one of the first SRS resource set and the second SRS resource set at the determined power level. In some embodiments of this aspect, each SRS resource in the first SRS resource set and the second SRS resource set is only part of one of the first SRS resource set and the second SRS resource set. In some embodiments of this aspect, the method further includes, if the at least one SRS resource is shared between the first SRS resource set and the second SRS resource set, using at most one of the first SRS resource set and the second SRS resource set to transmit the SRS on the shared at least one SRS resource. In some embodiments of this aspect, the method further includes, if the at least one SRS resource is shared between the first SRS resource set and the second SRS resource set, determining that transmitting the SRS on the shared at least one SRS resource in a same orthogonal frequency division multiplexing, OFDM, symbol is not allowed.

In some embodiments of this aspect, a shared SRS resource between the first SRS resource set and the second SRS resource set is permitted based at least in part on at least one condition. In some embodiments of this aspect, the at least one condition corresponds to at least one of: an SRS-SetUse parameter, a power control parameter and a number of ports configured in the first SRS resource set and the second SRS resource set. In some embodiments of this aspect, determining the power level to transmit the SRS on the at least one SRS resource further includes, if the at least one SRS resource is shared between the first SRS resource set and the second SRS resource set, determining which of the first SRS transmission power value and the second SRS transmission power value to use for transmitting the SRS on the shared at least one SRS resource based at least in part on a priority.

In some embodiments of this aspect, the method further includes, if the at least one SRS resource is shared between the first SRS resource set and the second SRS resource set, one of: transmitting the SRS on the at least one shared SRS resource at a single power level only if the first SRS transmission power value and the second SRS transmission power value are the same; transmitting the SRS on the at least one shared SRS resource at a largest of the first and second SRS transmission power values; and transmitting the SRS on the at least one shared SRS resource at an average of the first and second SRS transmission power values.

In another aspect of the present disclosure, a method implemented in a network node is provided. The method includes communicating at least a first sounding reference signal, SRS, resource set configuration for a first SRS resource set, the first SRS resource set configuration corresponding to a first SRS transmission power value. The method includes communicating at least a second SRS resource set configuration for a second SRS resource set, the second SRS resource set configuration corresponding to a second SRS transmission power value. The method includes receiving an SRS, at a power level, on at least one SRS resource associated with at least one of the first SRS resource set and the second SRS resource set.

In some embodiments of this aspect, each SRS resource in the first SRS resource set and the second SRS resource set is only part of one of the first SRS resource set and the second SRS resource set. In some embodiments of this aspect, receiving the SRS further comprises receiving the SRS on the at least one SRS resource according to: if the at least one SRS resource is shared between the first SRS resource set and the second SRS resource set, at most one of the first SRS resource set and the second SRS resource set is used for transmission of the SRS on the shared at least one SRS resource. In some embodiments of this aspect, receiving the SRS further includes receiving the SRS on the at least one SRS resource according to: if the at least one SRS resource is shared between the first SRS resource set and the second SRS resource set, transmission of the SRS on the shared at least one SRS resource in a same in a same orthogonal frequency division multiplexing, OFDM, symbol is not allowed.

In some embodiments of this aspect, a shared SRS resource between the first SRS resource set and the second SRS resource set is permitted based at least in part on at least one condition. In some embodiments of this aspect, the at least one condition corresponds to at least one of: an SRS-SetUse parameter, a power control parameter and a number of ports configured in the first SRS resource set and the second SRS resource set. In some embodiments of this aspect, receiving the SRS further includes: if the at least one SRS resource is shared between the first SRS resource set and the second SRS resource set, receiving the SRS at the power level on the shared at least one SRS resource based at least in part on a priority. In some embodiments of this aspect, receiving the SRS at the power level on the at least one SRS resource further includes: if the at least one SRS resource is shared between the first SRS resource set and the second SRS resource set, one of: receiving the SRS on the at least one shared SRS resource at a single power level only if the first SRS transmission power value and the second SRS transmission power value are the same; receiving the SRS on the at least one shared SRS resource at a largest of the first and second SRS transmission power values; and receiving the SRS on the at least one shared SRS resource at an average of the first and second SRS transmission power values.

In another aspect of the present disclosure, a wireless device, WD, configured to communicate with a network node is provided. The WD includes processing circuitry. The processing circuitry is configured to cause the WD to obtain at least a first sounding reference signal, SRS, resource set configuration for a first SRS resource set, the first SRS resource set configuration corresponding to a first SRS transmission power value. The processing circuitry is configured to cause the WD to obtain at least a second SRS resource set configuration for a second SRS resource set, the second SRS resource set configuration corresponding to a second SRS transmission power value. The processing circuitry is configured to cause the WD to determine a power level to transmit an SRS on at least one SRS resource associated with at least one of the first SRS resource set and the second SRS resource set.

In some embodiments of this aspect, the processing circuitry is further configured to cause the WD to transmit the SRS on the at least one SRS resource associated with the at least one of the first SRS resource set and the second SRS resource set at the determined power level. In some embodiments of this aspect, each SRS resource in the first SRS resource set and the second SRS resource set is only part of one of the first SRS resource set and the second SRS resource set. In some embodiments of this aspect, the processing circuitry is further configured to cause the WD to: if the at least one SRS resource is shared between the first SRS resource set and the second SRS resource set, using at most one of the first SRS resource set and the second SRS resource set to transmit the SRS on the shared at least one SRS resource. In some embodiments of this aspect, the processing circuitry is further configured to cause the WD to: if the at least one SRS resource is shared between the first SRS resource set and the second SRS resource set, determine that transmitting the SRS on the shared at least one SRS resource in a same orthogonal frequency division multiplexing, OFDM, symbol is not allowed.

In some embodiments of this aspect, a shared SRS resource between the first SRS resource set and the second SRS resource set is permitted based at least in part on at least one condition. In some embodiments of this aspect, the at least one condition corresponds to at least one of: an SRS-SetUse parameter, a power control parameter and a number of ports configured in the first SRS resource set and the second SRS resource set. In some embodiments of this aspect, the processing circuitry is further configured to cause the WD to determine the power level to transmit the SRS on the at least one SRS resource by being configured to cause the WD to: if the at least one SRS resource is shared between the first SRS resource set and the second SRS resource set, determine which of the first SRS transmission power value and the second SRS transmission power value to use for transmitting the SRS on the shared at least one SRS resource based at least in part on a priority.

In some embodiments of this aspect, the processing circuitry is further configured to cause the WD to, if the at least one SRS resource is shared between the first SRS resource set and the second SRS resource set, transmit the SRS on the at least one shared SRS resource at a single power level only if the first SRS transmission power value and the second SRS transmission power value are the same. In some embodiments of this aspect, the processing circuitry is further configured to cause the WD to, if the at least one SRS resource is shared between the first SRS resource set and the second SRS resource set, transmit the SRS on the at least one shared SRS resource at a largest of the first and second SRS transmission power values. In some embodiments of this aspect, the processing circuitry is further configured to cause the WD to, if the at least one SRS resource is shared between the first SRS resource set and the second SRS resource set, transmit the SRS on the at least one shared SRS resource at an average of the first and second SRS transmission power values.

In another aspect of the present disclosure, a network node configured to communicate with a wireless device, WD, is provided. The network node includes processing circuitry. The processing circuitry is configured to cause the network node to communicate at least a first sounding reference signal, SRS, resource set configuration for a first SRS resource set, the first SRS resource set configuration corresponding to a first SRS transmission power value. The processing circuitry is configured to cause the network node to communicate at least a second SRS resource set configuration for a second SRS resource set, the second SRS resource set configuration corresponding to a second SRS transmission power value. The processing circuitry is configured to cause the network node to receive an SRS, at a power level, on at least one SRS resource associated with at least one of the first SRS resource set and the second SRS resource set.

In some embodiments of this aspect, each SRS resource in the first SRS resource set and the second SRS resource set is only part of one of the first SRS resource set and the second SRS resource set. In some embodiments of this aspect, the processing circuitry is further configured to cause the network node to receive the SRS by being configured to cause the network node to receive the SRS on the at least one SRS resource according to: if the at least one SRS resource is shared between the first SRS resource set and the second SRS resource set, at most one of the first SRS resource set and the second SRS resource set is used for transmission of the SRS on the shared at least one SRS resource. In some embodiments of this aspect, the processing circuitry is further configured to cause the network node to receive the SRS by being configured to cause the network node to receive the SRS on the at least one SRS resource according to: if the at least one SRS resource is shared between the first SRS resource set and the second SRS resource set, transmission of the SRS on the shared at least one SRS resource in a same in a same orthogonal frequency division multiplexing, OFDM, symbol is not allowed.

In some embodiments of this aspect, a shared SRS resource between the first SRS resource set and the second SRS resource set is permitted based at least in part on at least one condition. In some embodiments of this aspect, the at least one condition corresponds to at least one of: an SRS-SetUse parameter, a power control parameter and a number of ports configured in the first SRS resource set and the second SRS resource set. In some embodiments of this aspect, the processing circuitry is further configured to cause the network node to receive the SRS by being configured to cause the network node to: if the at least one SRS resource is shared between the first SRS resource set and the second SRS resource set, receive the SRS at the power level on the shared at least one SRS resource based at least in part on a priority.

In some embodiments of this aspect, the processing circuitry is further configured to cause the network node to receive the SRS by being configured to cause the network node to: if the at least one SRS resource is shared between the first SRS resource set and the second SRS resource set, receive the SRS on the at least one shared SRS resource at a single power level only if the first SRS transmission power value and the second SRS transmission power value are the same. In some embodiments of this aspect, the processing circuitry is further configured to cause the network node to receive the SRS by being configured to cause the network node to: if the at least one SRS resource is shared between the first SRS resource set and the second SRS resource set, receive the SRS on the at least one shared SRS resource at a largest of the first and second SRS transmission power values. In some embodiments of this aspect, the processing circuitry is further configured to cause the network node to receive the SRS by being configured to cause the network node to: if the at least one SRS resource is shared between the first SRS resource set and the second SRS resource set, receive the SRS on the at least one shared SRS resource at an average of the first and second SRS transmission power values.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
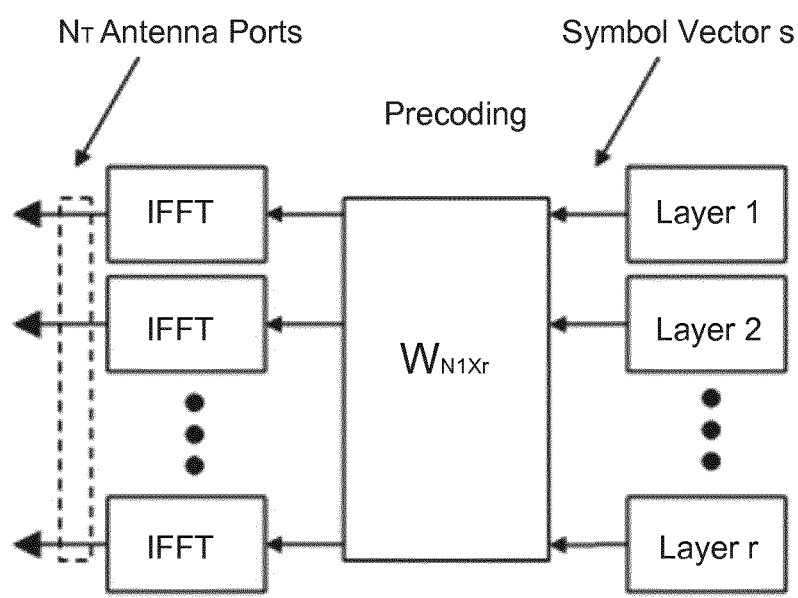
FIG. 1 illustrates an example transmission structure of precoded spatial multiplexing mode in NR.

Some embodiments of this disclosure may provide arrangements for efficient and unambiguous transmission for SRS in wireless networks, such as those based on NR. Some embodiments of this disclosure provide for connecting the SRS power control to the SRS resources, instead of the SRS resource sets. Some embodiments forbid shared SRS resources between different SRS resource sets. Some embodiments include conditions on the SRS configurations such that only shared SRS resources are possible when the described problem does not arise. Some embodiments of this disclosure provide for specifying that it is up to network configuration to ensure that the WDs are configured in such a way that the problem does not arise. Yet other embodiments of this disclosure introduce priority rules that specify what should happen when the problem arises.

Before describing in detail exemplary embodiments, it is noted that the embodiments reside primarily in combinations of apparatus components and processing steps related to restricting SRS power control configurations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

In some embodiments, the phrases "shared resource," "resource is shared between a first resource set and a second resource set" and the like may be used herein and may indicate that in the resource set configurations there is a resource that is in two or more of the resource sets. In some embodiments, a shared resource between resource sets is prohibited. In other embodiments, a shared resource is permitted but may impose restrictions on use of the resource sets to transmit SRS.

In some embodiments, the term "SRS resource" used herein may indicate a combination of subcarriers, time slots, codes, symbols, resource elements and/or spatial dimensions for radio transmission communications and in particular transmission of one or more SRSs. In some embodiments, the term "SRS resource set" used herein may indicate one or more resources for SRS configured in a particular manner, such as, for example, via a higher layer parameter SRS-SetUse, which may be set to one of, for example, 'codebook,' 'nonCodebook,' 'beamManagement,' and 'AntennaSwitching,'. In some embodiments, an SRS resource set may include one or more SRS resources. In some embodiments, the "SRS resource set" may be provided in other configurations.

Although the description herein may be explained in the context of a particular channel or signal, it should be understood that the principles may also be applicable to other channels and signals, as well. Any two or more embodiments described in this disclosure may be combined in any way with each other.

In some embodiments, the term "resource", as used herein, may be interpreted in a general way and may indicate an arbitrary combination of subcarriers, time slots, codes, symbols, resource elements and/or spatial dimensions.

Generally, it may be considered that the network, e.g. a signaling radio node and/or node arrangement (e.g., network node 16), configures a WD 22, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Receiving (or obtaining) control information may comprise receiving one or more control information messages (e.g., an RRC monitoring parameter). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of an SRS power control configuration rule, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a radio node, in particular a terminal or WD (e.g., WD 22), may refer to the radio node being adapted or caused or set and/or instructed to operate according to the configuration (e.g., to monitor an x-RNTI or a binary sequence for C-RNTI to determine which table to be used to interpret an indication or signal). Configuring may be done by another device, e.g., a network node (e.g., network node 16) (for example, a base station or gNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) and in yet further embodiments may be a flexible PUSCH.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device (WD) or node may involve instructing and/or causing the wireless device or node to change its configuration, e.g., at least one setting and/or register entry and/or operational mode and/or power control configuration. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending configuration data to the terminal indicating which rule (e.g., SRS power control configuration rule) to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

In some embodiments, the term communication direction is intended to indicate an UL communication direct (i.e., communications from the WD to the network node) and/or a DL communication direction (i.e., communications in a direction from the network node to the WD).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 8:
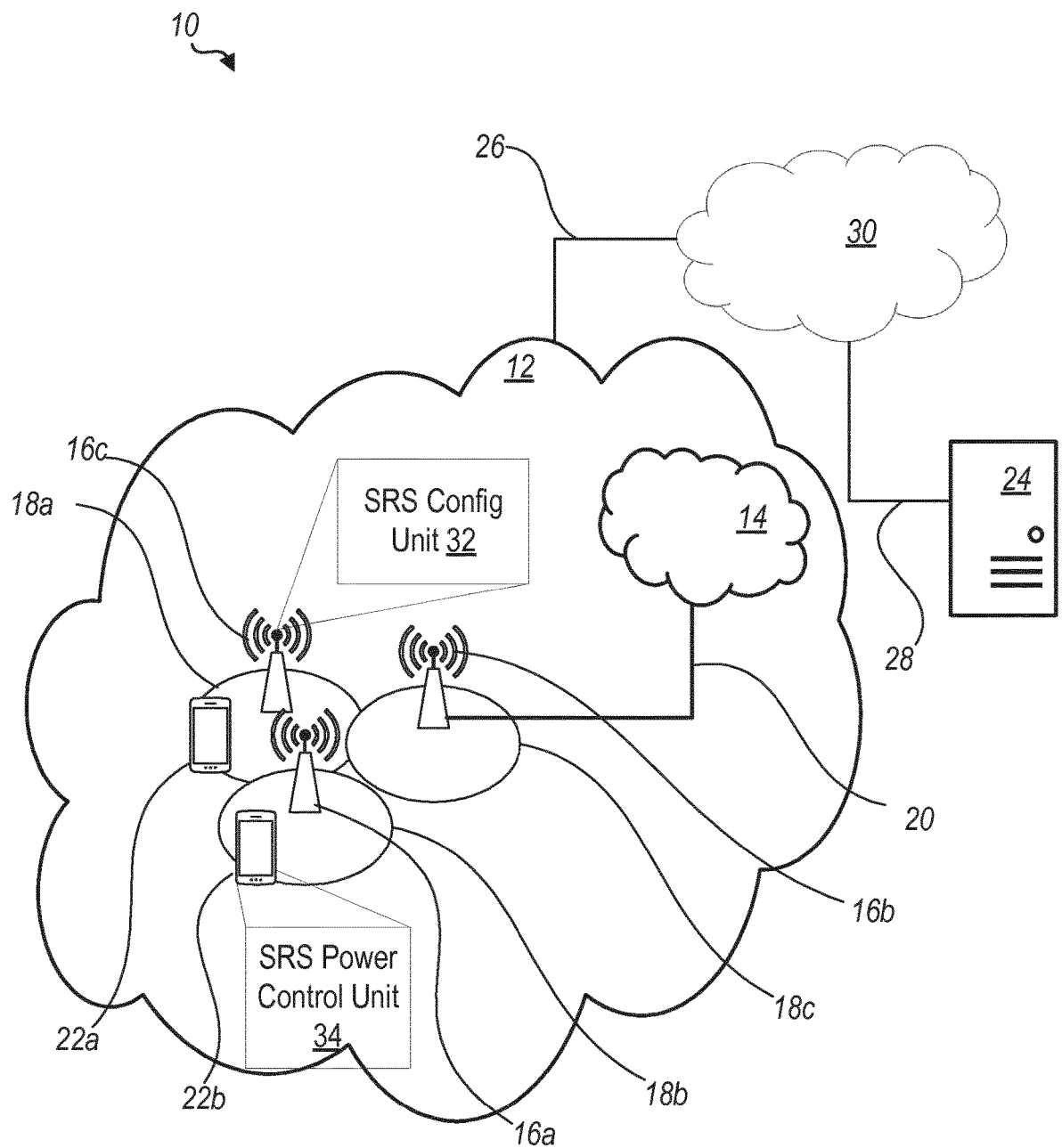
FIG. 8 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an SRS Configuration unit 32 which is configured to communicate at least a first sounding reference signal (SRS) resource set configuration for a first SRS resource set associated with the WD, the first SRS resource set configuration corresponding to a first SRS transmission power value; communicate at least a second SRS resource set configuration for a second SRS resource set associated with the WD, the second SRS resource set configuration corresponding to a second SRS transmission power value, each of the at least first and second SRS resource sets associated with at least one shared SRS resource; and receive the at least one shared SRS resource from the WD at a single power level according to at least one predetermined rule.

A wireless device 22 is configured to include an SRS Power Control unit 34 which is configured to obtain at least a first sounding reference signal (SRS) resource set configuration for a first SRS resource set, the first SRS resource set configuration corresponding to a first SRS transmission power value; obtain at least a second SRS resource set configuration for a second SRS resource set, the second SRS resource set configuration corresponding to a second SRS transmission power value, each of the at least first and second SRS resource sets associated with at least one shared SRS resource; and determine a single power level to transmit the at least one shared SRS resource according to at least one predetermined rule.

Figure 2:
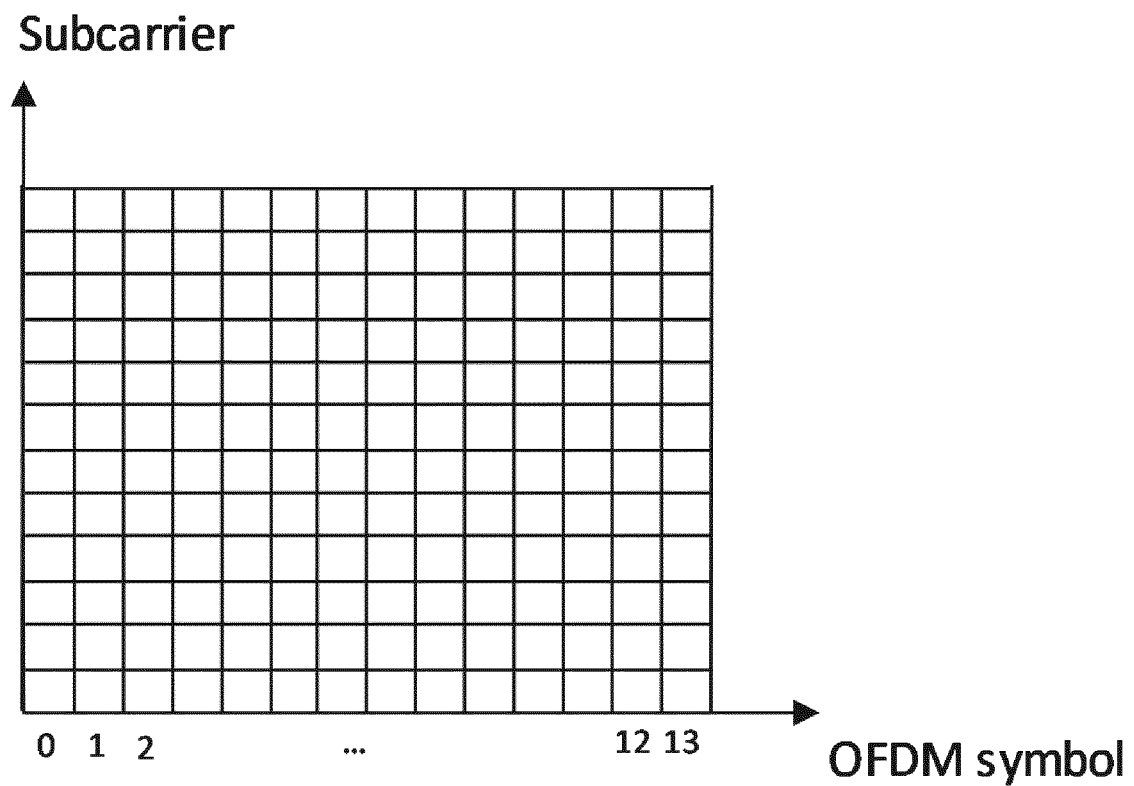
FIG. 2 illustrates an example of NR physical resources.
Figure 3:
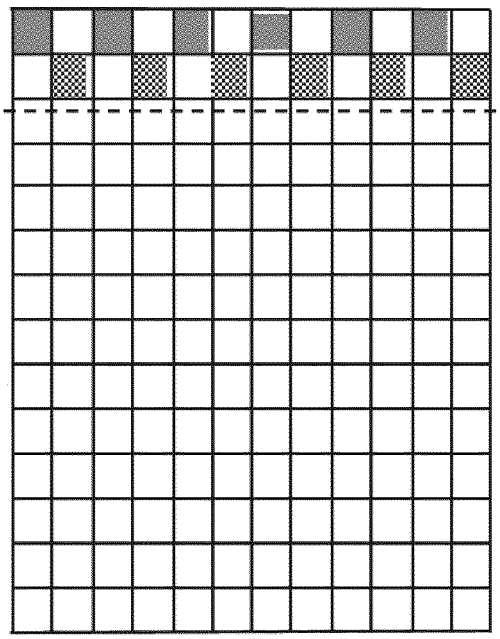
FIG. 3 illustrates three potential configurations of two SRS resources of one SRS resource set for codebook based transmission.
Figure 3:
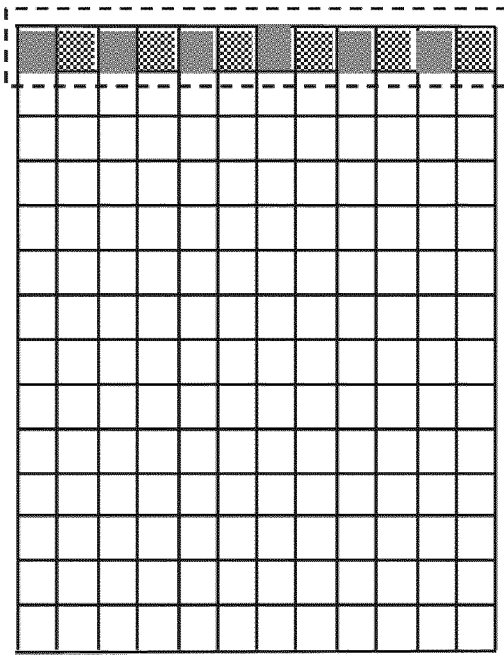
Figure 3:
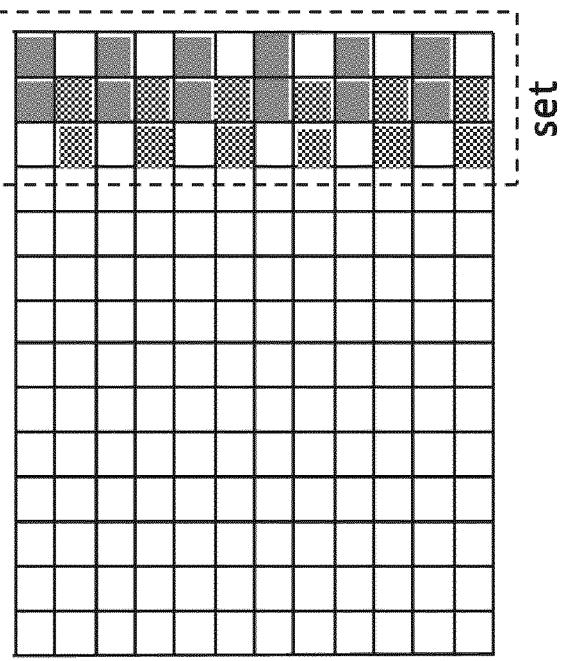
Figure 4:
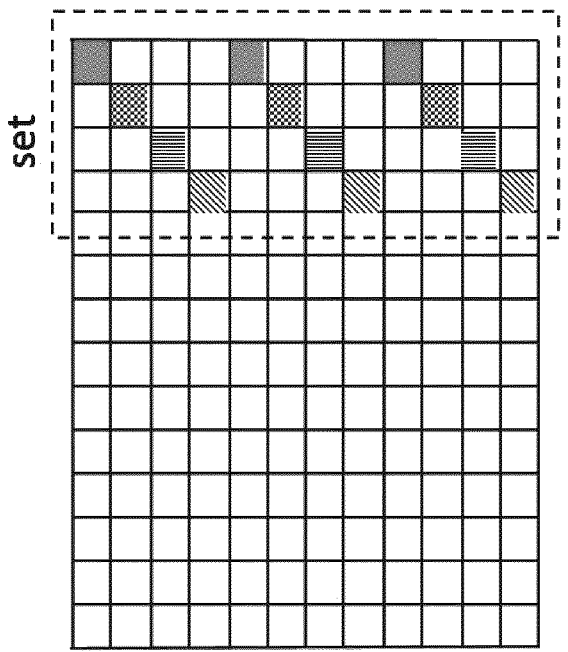
FIG. 4 illustrates three potential configurations of four SRS resources of one SRS resource set for non-codebook based transmission.
Figure 4:
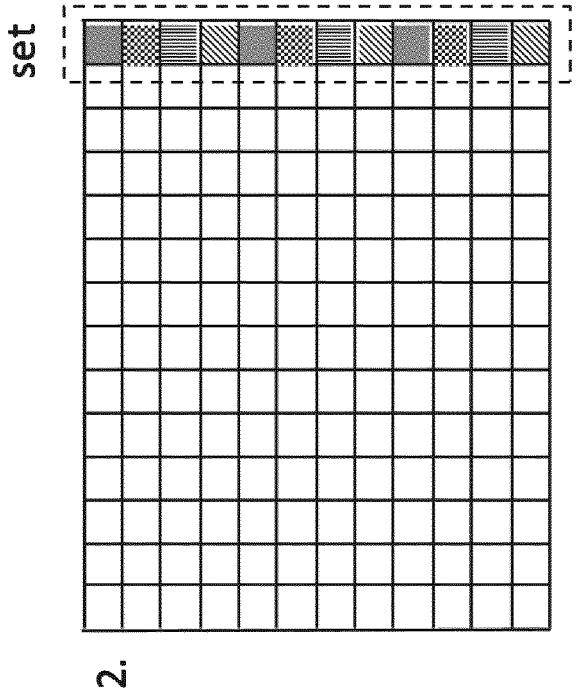
Figure 4:
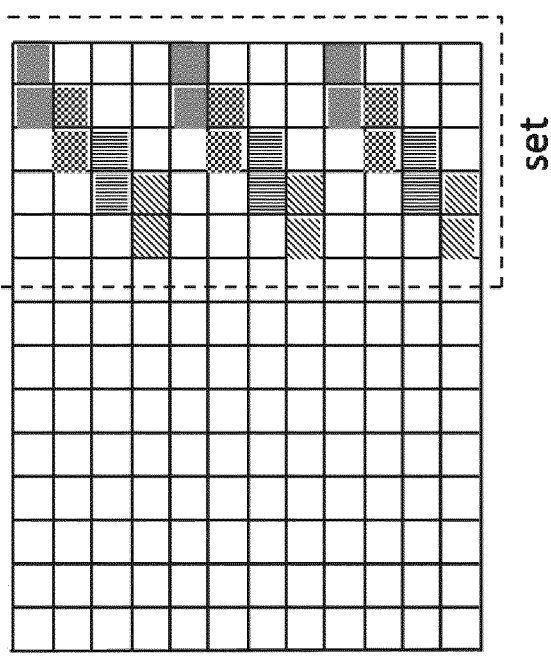
Figure 5:
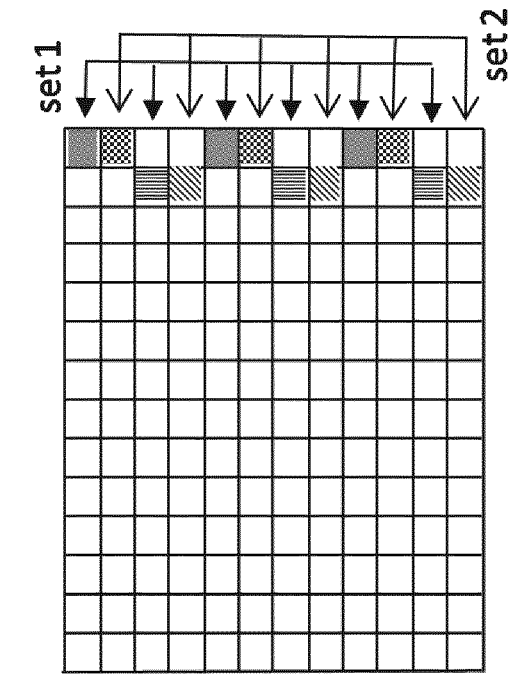
FIG. 5 illustrates three potential configurations of four SRS resources in either one or two SRS resource set(s) for beam management transmission.
Figure 5:
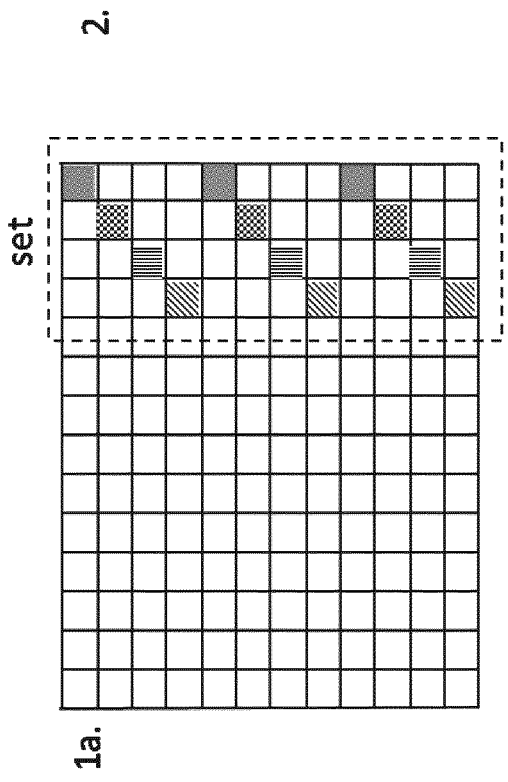
Figure 5:
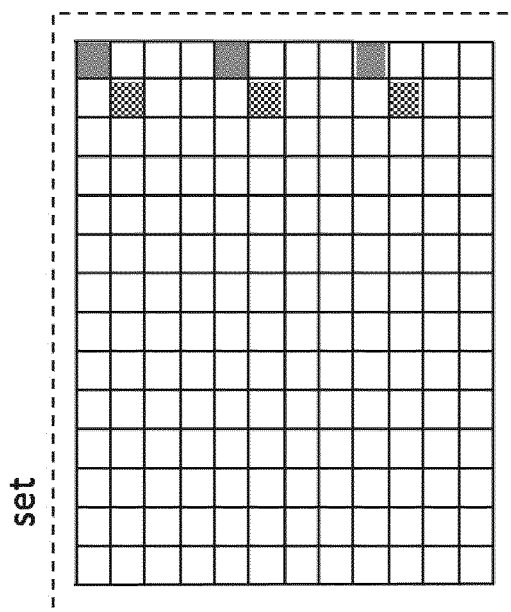
Figure 5:
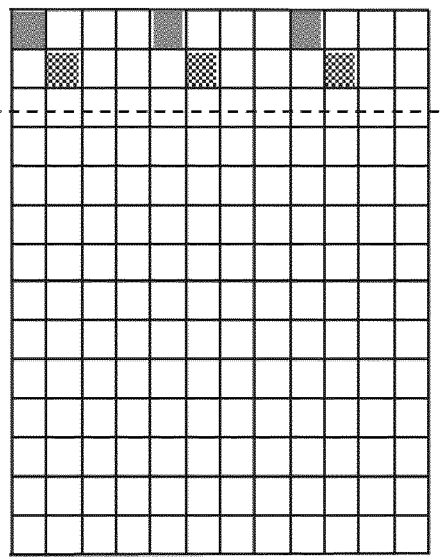
Figure 6:
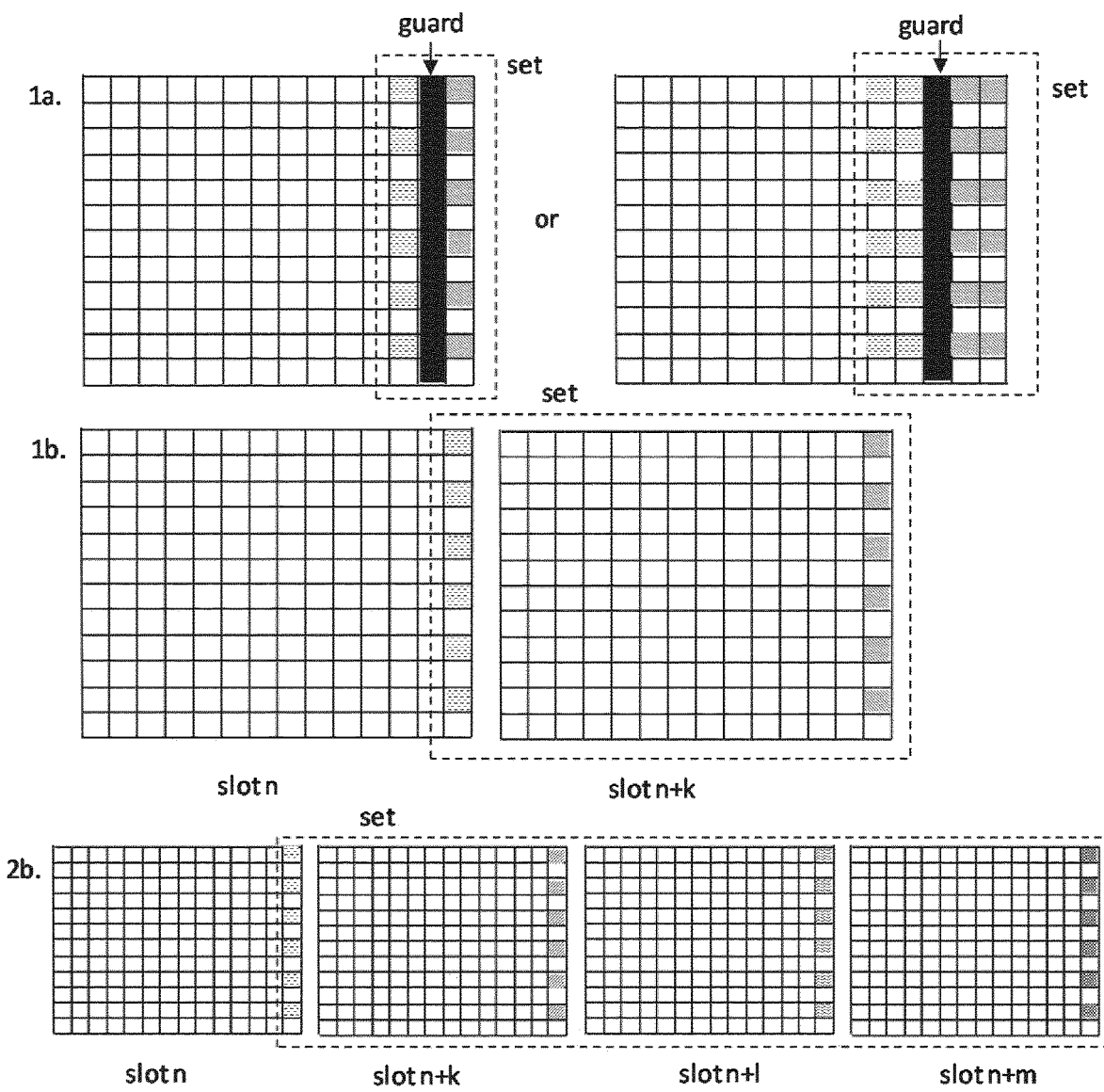
FIG. 6 illustrates three potential configurations of two or four SRS resources of one SRS resource set for antenna switching.
Figure 7:
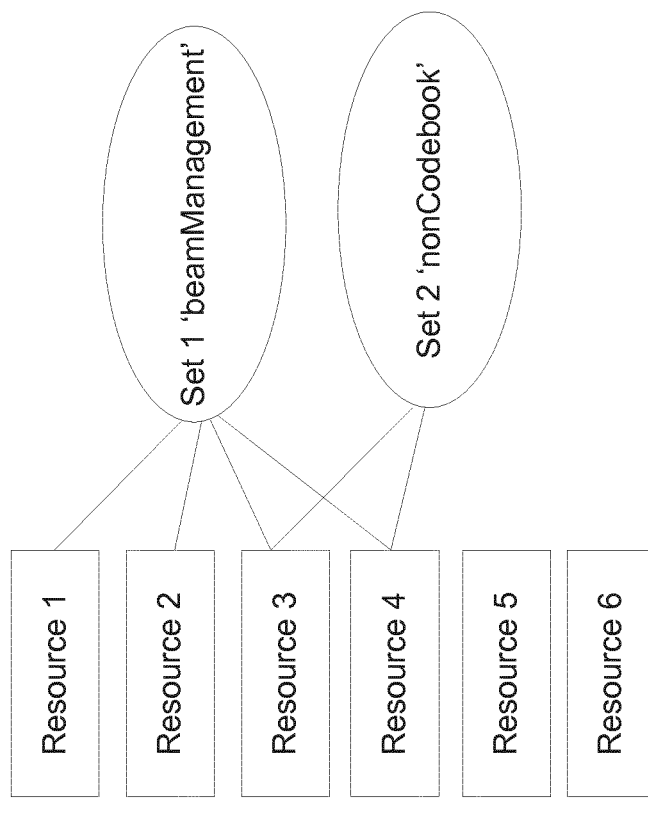
FIG. 7 illustrates two example configurations of a set of SRS resource sets.
Figure 7:
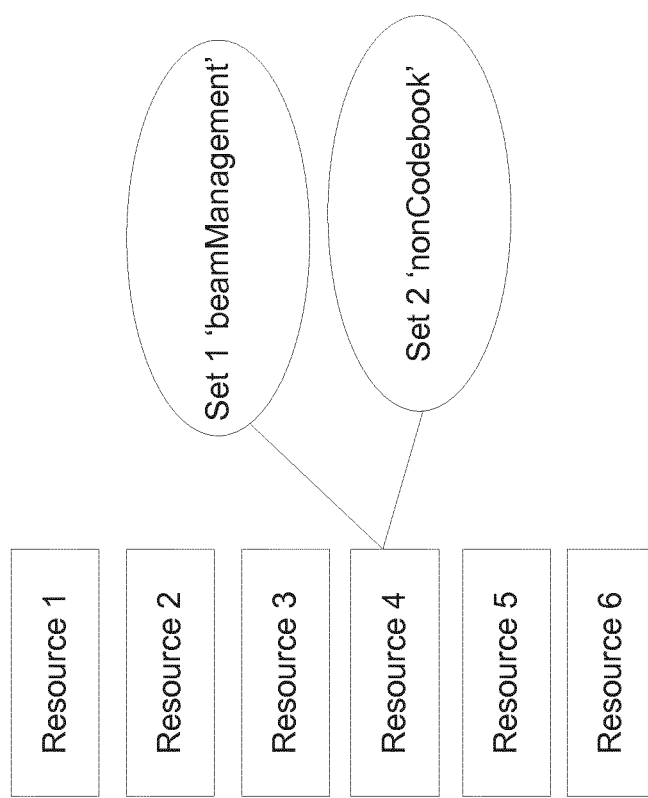

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as the process described with respect to FIG. 14.

For example, processing circuitry 68 of the network node 16 may include an SRS Configuration unit 32 configured to communicate at least a first sounding reference signal (SRS) resource set configuration for a first SRS resource set associated with the WD 22, the first SRS resource set configuration corresponding to a first SRS transmission power value; communicate at least a second SRS resource set configuration for a second SRS resource set associated with the WD 22, the second SRS resource set configuration corresponding to a second SRS transmission power value, each of the at least first and second SRS resource sets associated with at least one shared SRS resource; and receive the at least one shared SRS resource from the WD 22 at a single power level according to at least one predetermined rule.

In some embodiments, the processing circuitry 68, such as via the SRS Configuration unit 32, is configured to communicate an indication of the at least one predetermined rule to the WD 22. In some embodiments, the at least one predetermined rule includes one or more of: transmit the at least one shared SRS resource at the single power level only if the first SRS transmission power value is the same as the second SRS transmission power value; transmit the at least one shared SRS resource at a largest of the first and second SRS transmission power values; and transmit the at least one shared SRS resource at an average of the first and second SRS transmission power values.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, such as the process described with respect to FIG. 15.

For example, the processing circuitry 84 of the wireless device 22 may include an SRS Power Control unit 34 configured to obtain at least a first sounding reference signal (SRS) resource set configuration for a first SRS resource set, the first SRS resource set configuration corresponding to a first SRS transmission power value; obtain at least a second SRS resource set configuration for a second SRS resource set, the second SRS resource set configuration corresponding to a second SRS transmission power value, each of the at least first and second SRS resource sets associated with at least one shared SRS resource; and determine a single power level to transmit the at least one shared SRS resource according to at least one predetermined rule. In some embodiments, the WD 22 may obtain the first and second SRS resource set configurations from the network node 16. In some embodiments, the WD 22 may obtain the configurations from itself; in other words, in some embodiments, the first and second SRS resource set configurations may be known to the WD 22 in, for example, local memory or may be determined by the WD 22 based on related information known to the WD 22.

In some embodiments, the processing circuitry 84, such as via the SRS Power Control unit 34, is further configured to cause the WD 22 to transmit the at least one shared SRS resource at the determined power level. In some embodiments, the at least one predetermined rule includes one or more of: transmit the at least one shared SRS resource at the single power level only if the first SRS transmission power value is the same as the second SRS transmission power value; transmit the at least one shared SRS resource at a largest of the first and second SRS transmission power values; and transmit the at least one shared SRS resource at an average of the first and second SRS transmission power values. In some embodiments, the first SRS transmission power value is different from the second SRS transmission power value and the first SRS resource set is different from the second SRS resource set.

Figure 9:
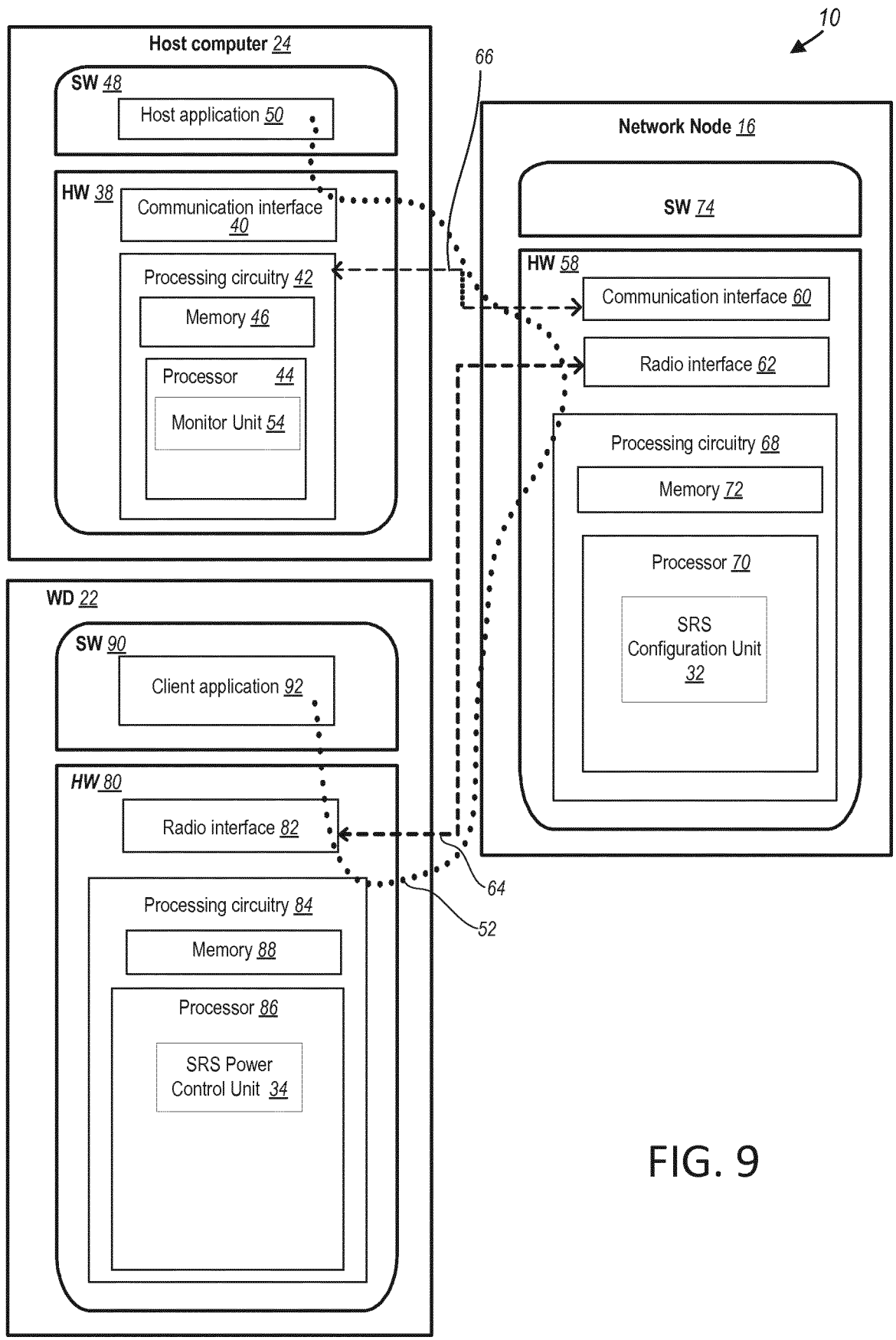
FIG. 9 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 9 and independently, the surrounding network topology may be that of FIG. 8.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 8 and 9 show various "units" such as SRS Configuration unit 32, and SRS Power Control unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 10, 11:
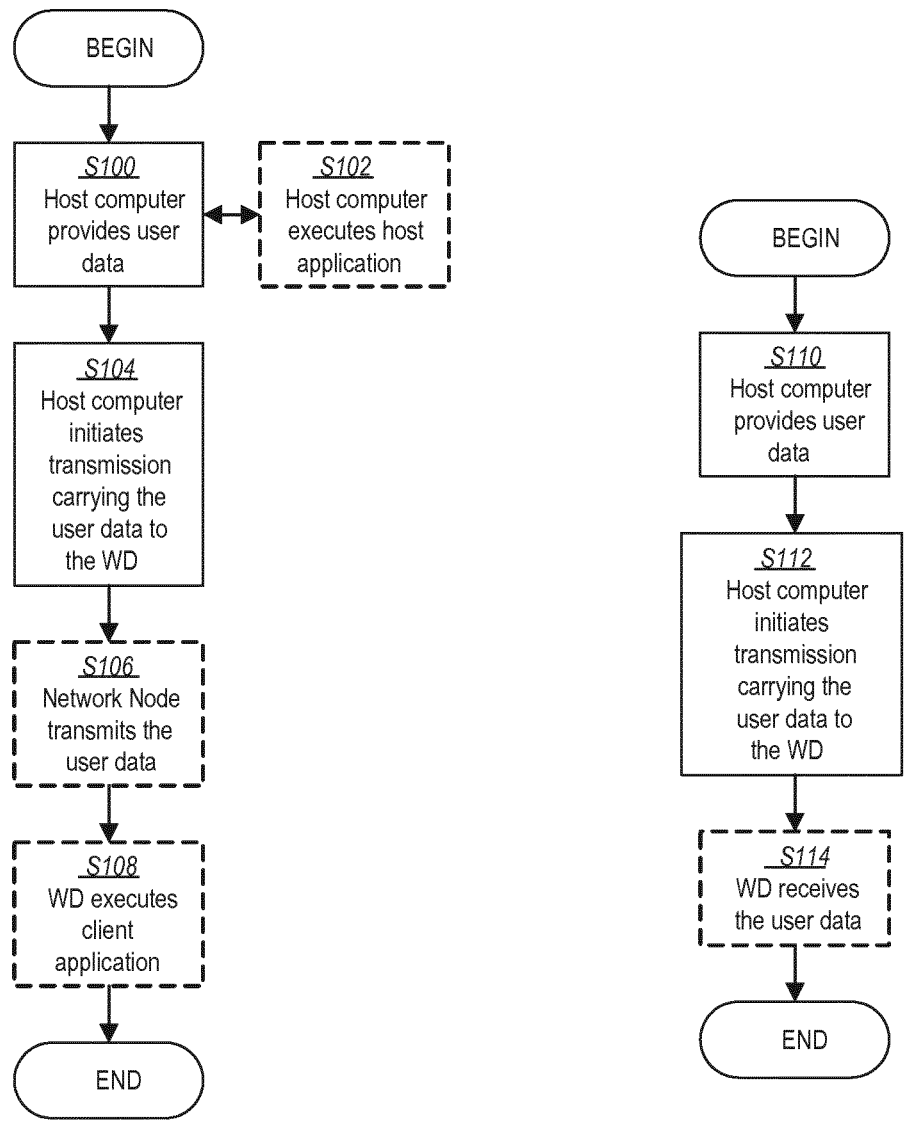
FIG. 10 is a flow chart illustrating exemplary methods implemented in a communication system including a host computer, a network node and a wireless device for executing a client application at a wireless device according to some embodiments of the present disclosure.
FIG. 11 is a flow chart illustrating exemplary methods implemented in a communication system including a host computer, a network node and a wireless device for receiving user data at a wireless device according to some embodiments of the present disclosure.

FIG. 10 is a flowchart illustrating an exemplary method implemented in a communication system, such as, for example, the communication system of FIGS. 8 and 9 in accordance with one embodiment. The communication system may include a host computer 24, a network node 16 and a WD 22, which may be those described with reference to FIG. 9. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

FIG. 11 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 12:
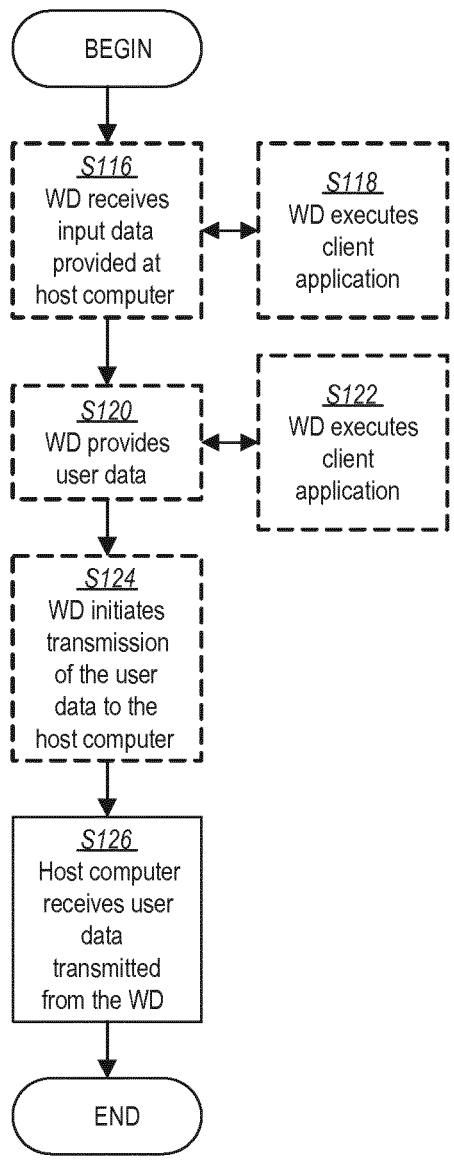
FIG. 12 is a flow chart illustrating exemplary methods implemented in a communication system including a host computer, a network node and a wireless device for receiving user data from the wireless device at a host computer according to some embodiments of the present disclosure.

FIG. 12 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 13:
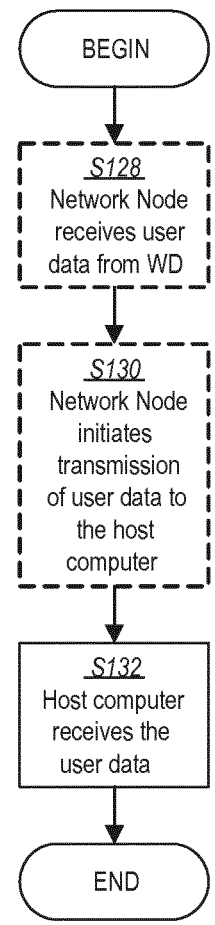
FIG. 13 is a flow chart illustrating exemplary methods implemented in a communication system including a host computer, a network node and a wireless device for receiving user data at a host computer according to some embodiments of the present disclosure.

FIG. 13 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 14:
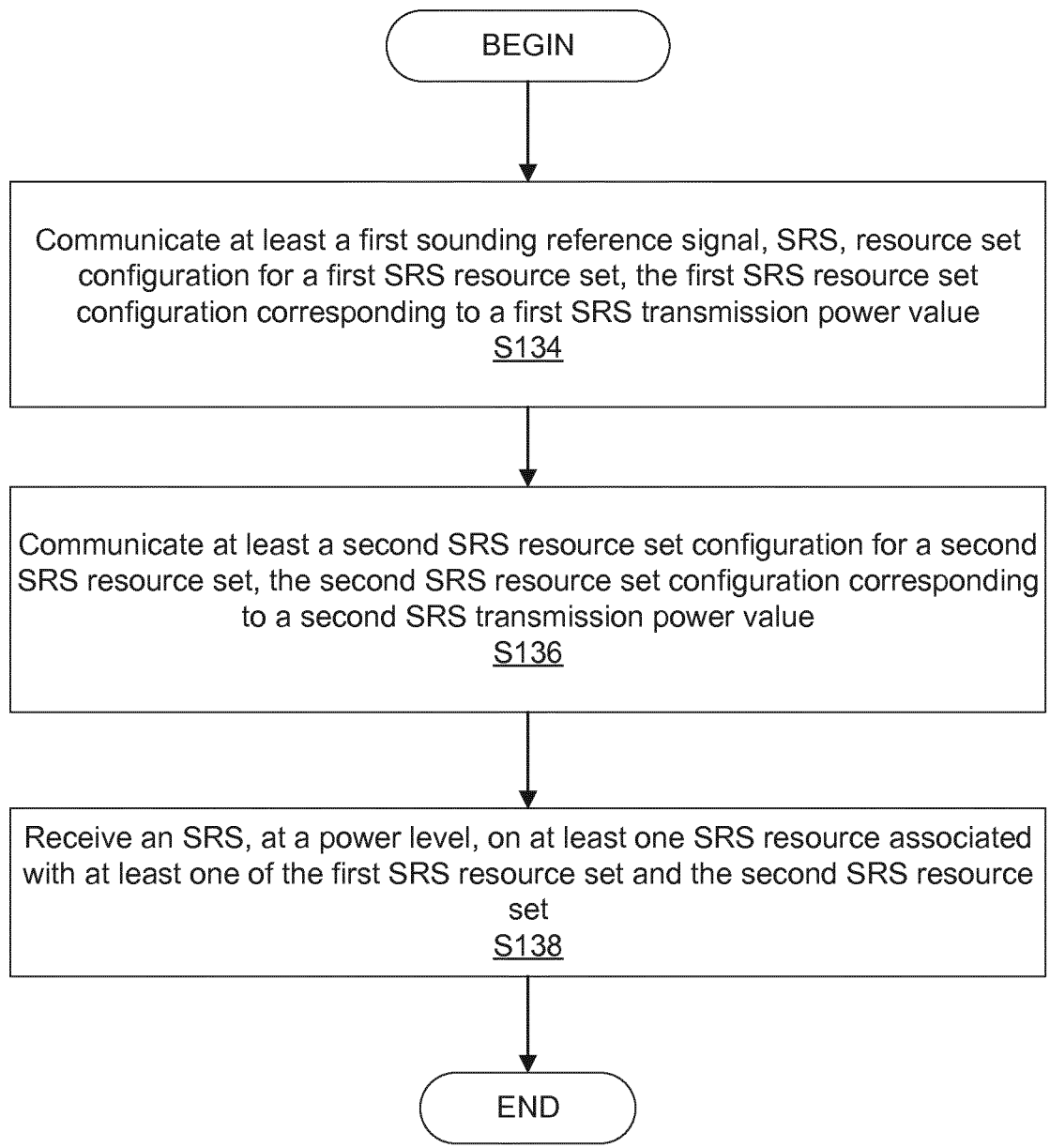
FIG. 14 is a flowchart of an exemplary process in a network node for an SRS configuration unit according to some embodiments of the present disclosure.

FIG. 14 is a flowchart of an exemplary process in a network node 16 according to the principles of this disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes communicating (Block S134), such as via configuration unit 32, processing circuitry 68, processor 70 and/or radio interface 62, at least a first sounding reference signal, SRS, resource set configuration for a first SRS resource set, the first SRS resource set configuration corresponding to a first SRS transmission power value. The method includes communicating (Block S136), such as via configuration unit 32, processing circuitry 68, processor 70 and/or radio interface 62, at least a second SRS resource set configuration for a second SRS resource set, the second SRS resource set configuration corresponding to a second SRS transmission power value. The method includes receiving (Block S138), such as via configuration unit 32, processing circuitry 68, processor 70 and/or radio interface 62, an SRS, at a power level, on at least one SRS resource associated with at least one of the first SRS resource set and the second SRS resource set.

In some embodiments, each SRS resource in the first SRS resource set and the second SRS resource set is only part of one of the first SRS resource set and the second SRS resource set. In some embodiments, receiving, such as via configuration unit 32, processing circuitry 68, processor 70 and/or radio interface 62, the SRS further includes receiving the SRS on the at least one SRS resource according to: if the at least one SRS resource is shared between the first SRS resource set and the second SRS resource set, at most one of the first SRS resource set and the second SRS resource set is used for transmission of the SRS on the shared at least one SRS resource in a time slot. As such, only one SRS resource set is used for transmission during a time period, e.g. in a slot. In some embodiments, receiving, such as via configuration unit 32, processing circuitry 68, processor 70 and/or radio interface 62, the SRS further includes receiving the SRS on the at least one SRS resource according to: if the at least one SRS resource is shared between the first SRS resource set and the second SRS resource set, transmission of the SRS on the shared at least one SRS resource in a same in a same orthogonal frequency division multiplexing, OFDM, symbol is not allowed.

In some embodiments, a shared SRS resource between the first SRS resource set and the second SRS resource set is permitted based at least in part on at least one condition. In some embodiments, the at least one condition corresponds to at least one of: an SRS-SetUse parameter, a power control parameter and a number of ports configured in the first SRS resource set and the second SRS resource set. In some embodiments, receiving the SRS further includes: if the at least one SRS resource is shared between the first SRS resource set and the second SRS resource set, receiving the SRS at the power level on the shared at least one SRS resource based at least in part on a priority.

In some embodiments, receiving the SRS at the power level on the at least one SRS resource further includes: if the at least one SRS resource is shared between the first SRS resource set and the second SRS resource set, receiving, such as via configuration unit 32, processing circuitry 68, processor 70 and/or radio interface 62, the SRS on the at least one shared SRS resource at a single power level only if the first SRS transmission power value and the second SRS transmission power value are the same. In some embodiments, receiving the SRS at the power level on the at least one SRS resource further includes: if the at least one SRS resource is shared between the first SRS resource set and the second SRS resource set, receiving, such as via configuration unit 32, processing circuitry 68, processor 70 and/or radio interface 62, the SRS on the at least one shared SRS resource at a largest of the first and second SRS transmission power values. In some embodiments, receiving the SRS at the power level on the at least one SRS resource further includes: if the at least one SRS resource is shared between the first SRS resource set and the second SRS resource set, receiving, such as via configuration unit 32, processing circuitry 68, processor 70 and/or radio interface 62, the SRS on the at least one shared SRS resource at an average of the first and second SRS transmission power values.

In another embodiment, the process includes communicating, such as via SRS Configuration unit 32, at least a first sounding reference signal (SRS) resource set configuration for a first SRS resource set associated with the WD 22, the first SRS set configuration corresponding to a first SRS transmission power value. The process includes communicating at least a second SRS set configuration for a second SRS set associated with the WD 22, the second SRS resource set configuration corresponding to a second SRS transmission power value, each of the at least first and second SRS resource sets associated with at least one shared SRS resource. The process includes receiving, such as via SRS Configuration unit 32, the at least one shared SRS resource from the WD 22 at a single power level according to at least one predetermined rule. In some embodiments, the process includes communicating, such as via SRS Configuration unit 32, an indication of the at least one predetermined rule to the WD 22. In some embodiments, the at least one predetermined rule includes one or more of: transmit the at least one shared SRS resource at the single power level only if the first SRS transmission power value is the same as the second SRS transmission power value; transmit the at least one shared SRS resource at a largest of the first and second SRS transmission power values; and transmit the at least one shared SRS resource at an average of the first and second SRS transmission power values.

Figure 15:
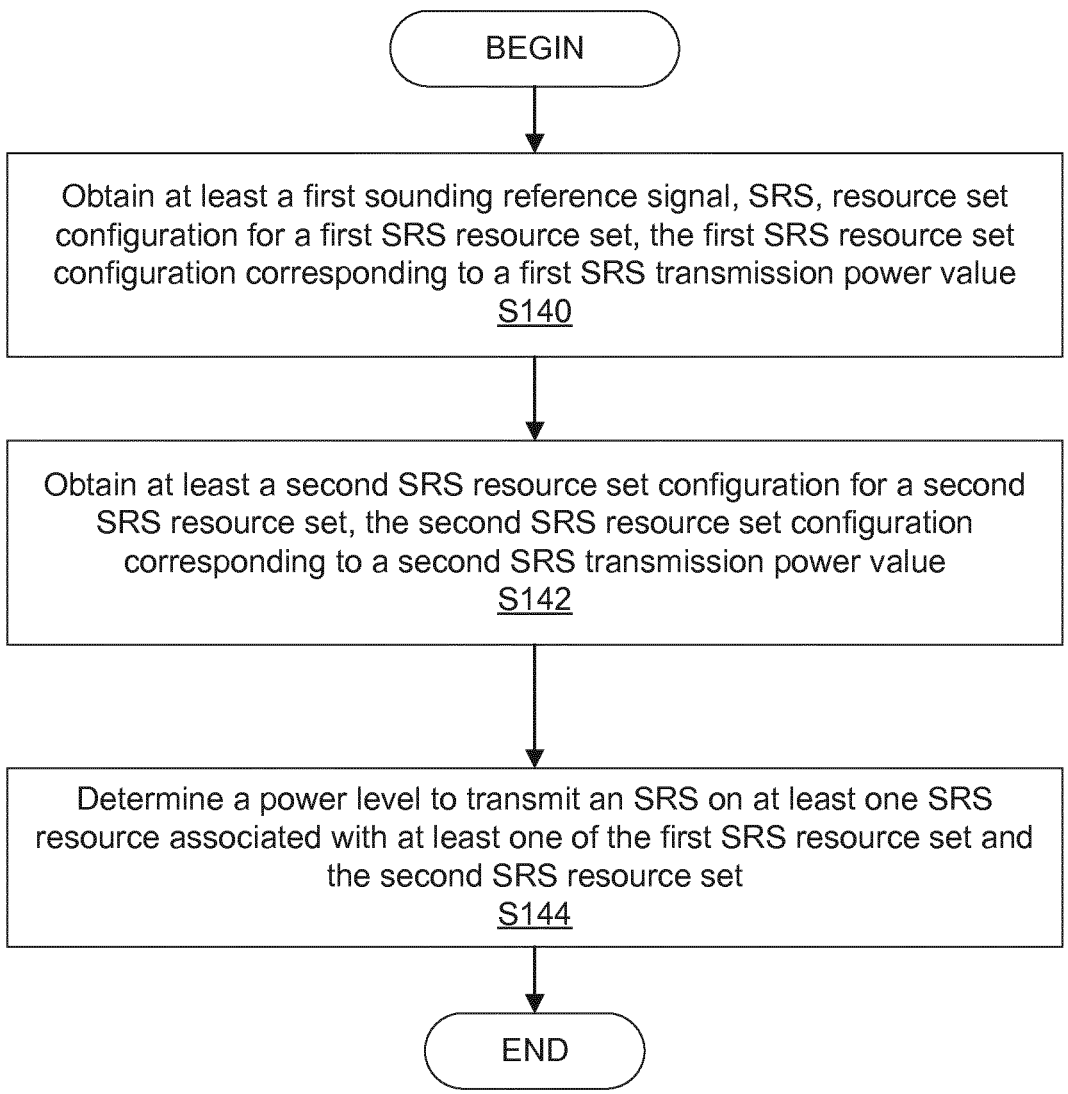
FIG. 15 is a flowchart of an exemplary process in a wireless device for an SRS power control unit according to some embodiments of the present disclosure.

FIG. 15 is a flowchart of an exemplary process in a wireless device 22 according to some embodiments of the present disclosure. One or more Blocks and/or functions and/or methods performed by WD 22 may be performed by one or more elements of WD 22 such as by SRS power control unit 34 in processing circuitry 84, processor 86, radio interface 82, etc. The example method includes obtaining (Block S140), such as via SRS power control unit 34, processing circuitry 84, processor 86 and/or radio interface 82, at least a first sounding reference signal, SRS, resource set configuration for a first SRS resource set, the first SRS resource set configuration corresponding to a first SRS transmission power value. The method include obtaining (Block S142), such as via SRS power control unit 34, processing circuitry 84, processor 86 and/or radio interface 82, at least a second SRS resource set configuration for a second SRS resource set, the second SRS resource set configuration corresponding to a second SRS transmission power value. The method includes determining (Block S144), such as via SRS power control unit 34, processing circuitry 84, processor 86 and/or radio interface 82, a power level to transmit an SRS on at least one SRS resource associated with at least one of the first SRS resource set and the second SRS resource set.

In some embodiments, the method further includes transmitting, such as via SRS power control unit 34, processing circuitry 84, processor 86 and/or radio interface 82, the SRS on the at least one SRS resource associated with the at least one of the first SRS resource set and the second SRS resource set at the determined power level. In some embodiments, each SRS resource in the first SRS resource set and the second SRS resource set is only part of one of the first SRS resource set and the second SRS resource set. In some embodiments, the method further includes if the at least one SRS resource is shared between the first SRS resource set and the second SRS resource set, using, such as via SRS power control unit 34, processing circuitry 84, processor 86 and/or radio interface 82, at most one of the first SRS resource set and the second SRS resource set to transmit the SRS on the shared at least one SRS resource.

In some embodiments, the method further includes if the at least one SRS resource is shared between the first SRS resource set and the second SRS resource set, determining, such as via SRS power control unit 34, processing circuitry 84, processor 86 and/or radio interface 82, that transmitting the SRS on the shared at least one SRS resource in a same orthogonal frequency division multiplexing, OFDM, symbol is not allowed. In some embodiments, a shared SRS resource between the first SRS resource set and the second SRS resource set is permitted based at least in part on at least one condition. In some embodiments, the at least one condition corresponds to at least one of: an SRS-SetUse parameter, a power control parameter and a number of ports configured in the first SRS resource set and the second SRS resource set. In some embodiments, determining the power level to transmit the SRS on the at least one SRS resource further includes: if the at least one SRS resource is shared between the first SRS resource set and the second SRS resource set, determining, such as via SRS power control unit 34, processing circuitry 84, processor 86 and/or radio interface 82, which of the first SRS transmission power value and the second SRS transmission power value to use for transmitting the SRS on the shared at least one SRS resource based at least in part on a priority.

In some embodiments, the method further includes, if the at least one SRS resource is shared between the first SRS resource set and the second SRS resource set, transmitting, such as via SRS power control unit 34, processing circuitry 84, processor 86 and/or radio interface 82, the SRS on the at least one shared SRS resource at a single power level only if the first SRS transmission power value and the second SRS transmission power value are the same. In some embodiments, the method further includes, if the at least one SRS resource is shared between the first SRS resource set and the second SRS resource set, transmitting, such as via SRS power control unit 34, processing circuitry 84, processor 86 and/or radio interface 82, the SRS on the at least one shared SRS resource at a largest of the first and second SRS transmission power values. In some embodiments, the method further includes, if the at least one SRS resource is shared between the first SRS resource set and the second SRS resource set, transmitting, such as via SRS power control unit 34, processing circuitry 84, processor 86 and/or radio interface 82, the SRS on the at least one shared SRS resource at an average of the first and second SRS transmission power values.

In another embodiment, the process includes obtaining, such as via SRS Power Control unit 34, at least a first sounding reference signal (SRS) resource set configuration for a first SRS resource set, the first SRS set configuration corresponding to a first SRS transmission power value. The process includes obtaining, such as via SRS Power Control unit 34, at least a second SRS set configuration for a second SRS set, the second SRS resource set configuration corresponding to a second SRS transmission power value, each of the at least first and second SRS resource sets associated with at least one shared SRS resource. The process includes determining, such as via SRS Power Control unit 34, a single power level to transmit the at least one shared SRS resource according to at least one predetermined rule. In some embodiments, the process further includes transmitting, such as via radio interface 82, the at least one shared SRS resource at the determined power level. In some embodiments, the at least one predetermined rule includes one or more of: transmit the at least one shared SRS resource at the single power level only if the first SRS transmission power value is the same as the second SRS transmission power value; transmit the at least one shared SRS resource at a largest of the first and second SRS transmission power values; and transmit the at least one shared SRS resource at an average of the first and second SRS transmission power values. In some embodiments, the first SRS transmission power value is different from the second SRS transmission power value and the first SRS resource set is different from the second SRS resource set.

Having described some embodiments related to restricting and/or controlling SRS power control configurations, more detailed descriptions of at least some of the embodiments will be described below. Specifically, several embodiments on the configuration of SRS and SRS power control are described that may solve the previously presented problem(s), such as power control ambiguities or inconsistencies where different SRS resource sets are configured to share SRS resources.

Base Power Control on SRS Resource

In one embodiment, the SRS power control may be connected to or associated with the SRS resources instead of the SRS resource set. Hence, the parameters used for the power control by e.g., the WD 22, will be connected to SRS resources instead of the SRS resource sets. In some embodiments, this may be configured by the network node 16. In some embodiments, this may be configured by the WD 22. As such, the power for the SRS resources are separately or independently configured.

Forbid Shared SRS Resources Between SRS Resource Sets

In another embodiment, shared SRS resources between different SRS resource sets may be forbidden or prohibited e.g., by the WD 22 and/or network node 16, in the sense that each SRS resource can only be part of one SRS resource set. This can therefore prevent the situation where, for example, an SRS resource used by two different SRS resource sets is transmitted by e.g., the WD 22, in a slot and there will thus not be a problem with the WD 22 transmitting the SRS resource using the specified power for the SRS power control as given from $\hat{P}_{SRS,f,c}(i,qs,l)$ for the SRS resource set qs. As such, the WD 22 uses at most one (i.e. only one) of the first SRS resource set and the second SRS resource set to transmit the SRS on the shared at least one SRS resource.

In another embodiment, it may be prohibited at e.g., the WD 22, that two (or more) SRS resource sets be transmitted with a shared SRS resource in the same slot. Hence, two SRS resource sets can share one SRS resource but at most one of the SRS resource sets can transmit the SRS resource per slot. As such, the WD 22 is configured such that only one SRS resource set can transmit on the shared SRS resource at a time, e.g. per slot. Thereby, it may be feasible to apply both $\hat{P}_{SRS,f,c}(i1,qs=1,l)$ and $\hat{P}_{SRS,f,c}(i2,qs=2,l)$ for the two SRS resource sets since i1 and i2 would not be equal.

Yet another alternative approach is to instead consider this condition per OFDM symbol (rather than per slot) by restricting SRS power control configurations according to the following: if two (or more) SRS resource sets share a common SRS resource such SRS resource sets are not allowed to transmit the common SRS resource in the same OFDM symbol.

Include Conditions on the Configuration

Some embodiments provide for e.g., the WD 22 or the network node 16, including conditions on which SRS power control configurations, such as those discussed herein, are allowed or not allowed. Embodiments using this type of solution may contain conditions on both SRS-SetUse, as well as, the power control parameters where these parameters may comprise PO and/or alpha and/or pathlossReferenceRS and/or closed loop index 1 (PowerControlAdjustment_States in SRS-ResouceSet). As an example, two SRS resource sets with SRS-SetUse 'AntennaSwitching' and 'codebook' could share SRS resources if, for example, the SRS resource sets have the same set of power control parameters and the same number of ports, whereas two SRS resource sets with SRS-SetUse 'codebook' and 'nonCodebook' may be permitted to share any SRS resources. For example, the case of an SRS resource set with SRS-SetUse set to 'codebook' with N ports may be allowed to share the same SRS resource(s) as an SRS resource set with SRS-SetUse set to 'AntennaSwitching' using antenna switching and N ports. A further condition may be that all or at least some of the power control parameters should be shared between these SRS resource sets in order to share SRS resource(s).

In some embodiments, it may be provided that only fully overlapping SRS resource sets are allowed in the sense that both SRS resources sets include the same set of SRS resources. Alternatively, more complex configurations that share some of the SRS resources, but not all, may be allowed/permitted. This may lead to conditions on the power control parameters where for instance the power value PO for the first SRS resource set should be related, but not necessarily equal, to the power value PO for the second SRS resource set.

Leave it Up to Network Configuration

Some embodiments include the network (e.g., network node 16) specifying that the WD 22 should expect only SRS configurations such that if two (or more) SRS resource sets share at least one common SRS resource the SRS resource sets are configured in such a way that when the power for the two (or more) SRS resource sets, say $\hat{P}_{SRS,f,c}(i,qs=1,l)$ and $\hat{P}_{SRS,f,c}(i,qs=2,l)$, are applied to the shared SRS resource(s) the resulting power for the SRS resource is the same regardless of whether $\hat{P}_{SRS,f,c(i,qs=}1,l)$ or $\hat{P}_{SRS,f,c}(i,qs=2,l)$ is used to derive the power of the SRS resource. In some aspects, the network provides a configuration for the power to be the same for the two (or more) SRS resource sets sharing a resource. Thus, in this manner the responsibility of ensuring that no ambiguities arise from shared SRS resources in the SRS power control configurations is moved to the network side and performed by for example, the network node 16 (rather than the WD 22). In some embodiments, if the network node 16 configures SRS resource sets with shared SRS resources in such a way that it becomes unclear with which power to transmit the shared SRS resources, it may be up to the WD 22 to decide on transmission power for such shared SRS resource(s).

Introduce Priority Rules

In some embodiments, there may be defined by, e.g., the WD 22 and/or the network node 16, one or more priority rules in the sense that when at least one SRS resource is used by at least two different SRS resource sets and these SRS resource sets have been configured in such a way that the power control framework specifies different powers for the shared SRS resource the WD 22 may apply one or more priority rules to determine what power to use for the shared SRS resource. For example, one or more priority rules may include transmitting SRS with the highest resulting power of the two or more powers, transmitting SRS with the lowest resulting power of the two or more powers, or transmitting SRS with the average value of the two or more powers, etc. Such priority rules could furthermore affect only the shared SRS resource in some embodiments, or alternatively the entire SRS resource set such that the power of all the SRS resources for the entire SRS resource set is rescaled accordingly.

Some additional embodiments include:

A method of determining a single transmission power for multiple SRS resources, comprising one or more of the following steps:
  receiving (or obtaining) at least a first and a second SRS resource set configuration, each comprising a first and a second SRS transmission power value respectively, wherein both SRS resource sets comprise a common SRS resource; and
  transmitting the common SRS resource at a single power level according to one of:
    if the first and second SRS transmission power values are the same, and
    the larger of the at least two SRS transmission power values.

In addition, some embodiments may include one or more of the following:

Embodiment A1. A network node configured to communicate with a wireless device (WD), the network node configured to, and/or comprising a radio interface and/or comprising processing circuitry configured to:
  communicate at least a first sounding reference signal (SRS) resource set configuration for a first SRS resource set associated with the WD, the first SRS resource set configuration corresponding to a first SRS transmission power value;
  communicate at least a second SRS resource set configuration for a second SRS resource set associated with the WD, the second SRS resource set configuration corresponding to a second SRS transmission power value, each of the at least first and second SRS resource sets associated with at least one shared SRS resource; and
  receive the at least one shared SRS resource from the WD at a single power level according to at least one predetermined rule.

Embodiment A2. The network node of Embodiment A1, wherein the processing circuitry is configured to communicate an indication of the at least one predetermined rule to the WD.

Embodiment A3. The network node of Embodiment A1, wherein the at least one predetermined rule includes one or more of:
  transmit the at least one shared SRS resource at the single power level only if the first SRS transmission power value is the same as the second SRS transmission power value;
  transmit the at least one shared SRS resource at a largest of the first and second SRS transmission power values; and
  transmit the at least one shared SRS resource at an average of the first and second SRS transmission power values.

Embodiment B1. A method implemented in a network node, the method comprising:
  communicating at least a first sounding reference signal (SRS) resource set configuration for a first SRS resource set associated with the WD, the first SRS resource set configuration corresponding to a first SRS transmission power value;
  communicating at least a second SRS resource set configuration for a second SRS resource set associated with the WD, the second SRS resource set configuration corresponding to a second SRS transmission power value, each of the at least first and second SRS resource sets associated with at least one shared SRS resource; and
  receiving the at least one shared SRS resource from the WD at a single power level according to at least one predetermined rule.

Embodiment B2. The method of Embodiment B1, further comprising communicating an indication of the at least one predetermined rule to the WD.

Embodiment B3. The method of Embodiment B1, wherein the at least one predetermined rule includes one or more of:
  transmit the at least one shared SRS resource at the single power level only if the first SRS transmission power value is the same as the second SRS transmission power value;
  transmit the at least one shared SRS resource at a largest of the first and second SRS transmission power values; and
  transmit the at least one shared SRS resource at an average of the first and second SRS transmission power values.

Embodiment C1. A wireless device (WD) configured to communicate with a network node, the WD configured to, and/or comprising a radio interface and/or processing circuitry configured to:
  obtain at least a first sounding reference signal (SRS) resource set configuration for a first SRS resource set, the first SRS resource set configuration corresponding to a first SRS transmission power value;
  obtain at least a second SRS resource set configuration for a second SRS resource set, the second SRS resource set configuration corresponding to a second SRS transmission power value, each of the at least first and second SRS resource sets associated with at least one shared SRS resource; and
  determine a single power level to transmit the at least one shared SRS resource according to at least one predetermined rule.

Embodiment C2. The WD of Embodiment C1, wherein the processing circuitry is further configured to cause the WD to transmit the at least one shared SRS resource at the determined power level.

Embodiment C3. The WD of Embodiment C1, wherein the at least one predetermined rule includes one or more of:
- transmit the at least one shared SRS resource at the single power level only if the first SRS transmission power value is the same as the second SRS transmission power value;
- transmit the at least one shared SRS resource at a largest of the first and second SRS transmission power values; and
- transmit the at least one shared SRS resource at an average of the first and second SRS transmission power values.

Embodiment C4. The WD of any one of Embodiments C1-C3, wherein the first SRS transmission power value is different from the second SRS transmission power value and the first SRS resource set is different from the second SRS resource set.

Embodiment D1. A method implemented in a wireless device (WD), the method comprising:
- obtaining at least a first sounding reference signal (SRS) resource set configuration for a first SRS resource set, the first SRS resource set configuration corresponding to a first SRS transmission power value;
- obtaining at least a second SRS resource set configuration for a second SRS resource set, the second SRS resource set configuration corresponding to a second SRS transmission power value, each of the at least first and second SRS resource sets associated with at least one shared SRS resource; and
- determining a single power level to transmit the at least one shared SRS resource according to at least one predetermined rule.

Embodiment D2. The method of Embodiment D1, further comprising transmitting the at least one shared SRS resource at the determined power level.

Embodiment D3. The method of Embodiment D1, wherein the at least one predetermined rule includes one or more of:
- transmit the at least one shared SRS resource at the single power level only if the first SRS transmission power value is the same as the second SRS transmission power value;
- transmit the at least one shared SRS resource at a largest of the first and second SRS transmission power values; and
- transmit the at least one shared SRS resource at an average of the first and second SRS transmission power values.

Embodiment D4. The method of any one of Embodiments D1-D3, wherein the first SRS transmission power value is different from the second SRS transmission power value and the first SRS resource set is different from the second SRS resource set.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented in a wireless device, WD, the method comprising:
    obtaining at least a first sounding reference signal, SRS, resource set configuration for a first SRS resource set, the first SRS resource set configuration corresponding to a first SRS transmission power value;
    obtaining at least a second SRS resource set configuration for a second SRS resource set, the second SRS resource set configuration corresponding to a second SRS transmission power value; and
    determining a power level to transmit an SRS on at least one shared SRS resource associated with each of the first SRS resource set and the second SRS resource set, determining the power level including determining a single power level for both of the first SRS resource set and the second SRS resource set, for transmitting the at least one shared SRS resource according to at least one predetermined rule.

2. The method of claim 1, wherein each SRS resource in the first SRS resource set and the second SRS resource set is only part of one of the first SRS resource set and the second SRS resource set.

3. The method of claim 1, further comprising:
    if the at least one shared SRS resource is shared between the first SRS resource set and the second SRS resource set, using at most one of the first SRS resource set and the second SRS resource set to transmit the SRS on the at least one shared SRS resource.

4. The method of claim 1, further comprising:
    if the at least one shared SRS resource is shared between the first SRS resource set and the second SRS resource set, determining that transmitting the SRS on the at least one shared SRS resource in a same orthogonal frequency division multiplexing, OFDM, symbol is not allowed.

5. The method of claim 1, wherein determining the power level to transmit the SRS on the at least one shared SRS resource further comprises:
    if the at least one shared SRS resource is shared between the first SRS resource set and the second SRS resource set, determining which of the first SRS transmission power value and the second SRS transmission power value to use for transmitting the SRS on the at least one shared SRS resource based at least in part on a priority.

6. The method of claim 1, further comprising, if the at least one shared SRS resource is shared between the first SRS resource set and the second SRS resource set, one of:
    transmitting the SRS on the at least one shared SRS resource at a single power level only if the first SRS transmission power value and the second SRS transmission power value are the same;
    transmitting the SRS on the at least one shared SRS resource at a largest of the first and second SRS transmission power values; and
    transmitting the SRS on the at least one shared SRS resource at an average of the first and second SRS transmission power values.

7. The method of claim 1, further comprising transmitting the SRS on the at least one shared SRS resource set at the determined power level.

8. A method implemented in a network node, the method comprising:
    communicating at least a first sounding reference signal, SRS, resource set configuration for a first SRS resource set, the first SRS resource set configuration corresponding to a first SRS transmission power value;
    communicating at least a second SRS resource set configuration for a second SRS resource set, the second SRS resource set configuration corresponding to a second SRS transmission power value; and
    receiving an SRS, at a power level, on at least one shared SRS resource associated with each of the first SRS resource set and the second SRS resource set, receiving the SRS at the power level including receiving at a single power level for both of the first SRS resource set and the second SRS resource set, for receiving the at least one shared SRS resource according to at least one predetermined rule.

9. The method of claim 8, wherein each SRS resource in the first SRS resource set and the second SRS resource set is only part of one of the first SRS resource set and the second SRS resource set.

10. The method of claim 8, wherein receiving the SRS further comprises receiving the SRS on the at least one shared SRS resource according to:
    if the at least one shared SRS resource is shared between the first SRS resource set and the second SRS resource set, at most one of the first SRS resource set and the second SRS resource set is used for transmission of the SRS on the at least one shared SRS resource.

11. The method of claim 8, wherein receiving the SRS at the power level on the at least one shared SRS resource further comprises:
    if the at least one shared SRS resource is shared between the first SRS resource set and the second SRS resource set, one of:
        receiving the SRS on the at least one shared SRS resource at a single power level only if the first SRS transmission power value and the second SRS transmission power value are the same;
        receiving the SRS on the at least one shared SRS resource at a largest of the first and second SRS transmission power values; and
        receiving the SRS on the at least one shared SRS resource at an average of the first and second SRS transmission power values.

12. A wireless device, WD, configured to communicate with a network node, the WD comprising processing circuitry, the processing circuitry configured to cause the WD to:
    obtain at least a first sounding reference signal, SRS, resource set configuration for a first SRS resource set, the first SRS resource set configuration corresponding to a first SRS transmission power value;

obtain at least a second SRS resource set configuration for a second SRS resource set, the second SRS resource set configuration corresponding to a second SRS transmission power value; and determine a power level to transmit an SRS on at least one shared SRS resource associated with each of the first SRS resource set and the second SRS resource set, determining the power level including determining a single power level for both of the first SRS resource set and the second SRS resource set, for transmitting the at least one shared SRS resource according to at least one predetermined rule.

13. The WD of claim 12, wherein each SRS resource in the first SRS resource set and the second SRS resource set is only part of one of the first SRS resource set and the second SRS resource set.

14. The WD of claim 12, wherein the processing circuitry is further configured to cause the WD to determine the power level to transmit the SRS on the at least one shared SRS resource by being configured to cause the WD to:
if the at least one shared SRS resource is shared between the first SRS resource set and the second SRS resource set, determine which of the first SRS transmission power value and the second SRS transmission power value to use for transmitting the SRS on the at least one shared SRS resource based at least in part on a priority.

15. The WD of claim 12, wherein the processing circuitry is further configured to cause the WD to, if the at least one shared SRS resource is shared between the first SRS resource set and the second SRS resource set, one of:
transmit the SRS on the at least one shared SRS resource at a single power level only if the first SRS transmission power value and the second SRS transmission power value are the same;
transmit the SRS on the at least one shared SRS resource at a largest of the first and second SRS transmission power values; and
transmit the SRS on the at least one shared SRS resource at an average of the first and second SRS transmission power values.

16. The WD of claim 12, wherein the processing circuitry is further configured to cause the WD to transmit the SRS on the at least one shared SRS resource at the determined power level.

17. A network node configured to communicate with a wireless device, WD, the network node comprising processing circuitry, the processing circuitry configured to cause the network node to:
communicate at least a first sounding reference signal, SRS, resource set configuration for a first SRS resource set, the first SRS resource set configuration corresponding to a first SRS transmission power value;
communicate at least a second SRS resource set configuration for a second SRS resource set, the second SRS resource set configuration corresponding to a second SRS transmission power value; and
receive an SRS, at a power level, on at least one shared SRS resource associated with each of the first SRS resource set and the second SRS resource set, receiving the SRS at the power level including receiving at a single power level for both of the first SRS resource set and the second SRS resource set, for receiving the at least one shared SRS resource according to at least one predetermined rule.

18. The network node of claim 17, wherein each SRS resource in the first SRS resource set and the second SRS resource set is only part of one of the first SRS resource set and the second SRS resource set.

19. The network node of claim 17, wherein the processing circuitry is further configured to cause the network node to receive the SRS by being configured to cause the network node to receive the SRS on the at least one shared SRS resource according to:
if the at least one shared SRS resource is shared between the first SRS resource set and the second SRS resource set, at most one of the first SRS resource set and the second SRS resource set is used for transmission of the SRS on the shared at least one shared SRS resource.

20. The network node of claim 17, wherein the processing circuitry is further configured to cause the network node to receive the SRS by being configured to cause the network node to:
if the at least one shared SRS resource is shared between the first SRS resource set and the second SRS resource set, receive the SRS at the power level on the at least one shared SRS resource based at least in part on a priority.

21. The network node of claim 17, wherein the processing circuitry is further configured to cause the network node to receive the SRS by being configured to cause the network node to:
if the at least one shared SRS resource is shared between the first SRS resource set and the second SRS resource set, one of:
receive the SRS on the at least one shared SRS resource at a single power level only if the first SRS transmission power value and the second SRS transmission power value are the same;
receive the SRS on the at least one shared SRS resource at a largest of the first and second SRS transmission power values; and
receive the SRS on the at least one shared SRS resource at an average of the first and second SRS transmission power values.

* * * * *